United States Patent
Al-Alloush et al.

(10) Patent No.: US 9,764,314 B2
(45) Date of Patent: *Sep. 19, 2017

(54) CONTROL OF FLUID CATALYTIC CRACKING PROCESS FOR MINIMIZING ADDITIVE USAGE IN THE DESULFURIZATION OF PETROLEUM FEEDSTOCKS

(75) Inventors: Saeed Saad Al-Alloush, Dammam (SA); Othman A. Taha, Dhahran (SA); M. Rashid Khan, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 671 days.

This patent is subject to a terminal disclaimer.

(21) Appl. No.: 12/785,647

(22) Filed: May 24, 2010

(65) Prior Publication Data
US 2010/0230324 A1    Sep. 16, 2010

Related U.S. Application Data

(63) Continuation-in-part of application No. 12/266,197, filed on Nov. 6, 2008, now abandoned, which is a
(Continued)

(51) Int. Cl.
*C10G 11/18* (2006.01)
*B01J 29/80* (2006.01)
(Continued)

(52) U.S. Cl.
CPC .............. *B01J 29/80* (2013.01); *C10G 11/05* (2013.01); *C10G 11/18* (2013.01); *C10G 11/187* (2013.01);
(Continued)

(58) Field of Classification Search
CPC ...... C10G 11/187; G05B 11/00; G05B 13/00; G05B 15/00
(Continued)

(56) References Cited

U.S. PATENT DOCUMENTS

| 3,074,878 A | 1/1963 | Pappas |
| 3,175,968 A | 3/1965 | Berger |

(Continued)

FOREIGN PATENT DOCUMENTS

| EP | 315179 B1 | 10/1991 |
| EP | 1273342 A | 1/2003 |

(Continued)

OTHER PUBLICATIONS

Johannsen, Process Control, Access Science, Accessed Oct. 17, 2014 <www.accessscience.com/content/process-control/546600>.*
(Continued)

*Primary Examiner* — Michelle Stein
(74) *Attorney, Agent, or Firm* — Bracewell LLP; Brad Y. Chin

(57) ABSTRACT

A method and apparatus for the cracking of a petroleum oil feedstock to produce a desulfurized full-range gasoline product. The petroleum oil feedstock is contacted with a base cracking catalyst and an FCC additive in an FCC unit, wherein the catalyst includes a stable Y-type zeolite and a rare-earth metal oxide and the additive includes a shape selective zeolite. The catalyst, additive and petroleum oil feedstock can be contacted in a down-flow or riser fluid catalytic cracking unit, that can also include a regeneration zone, a separation zone, and a stripping zone. The FCC unit includes an integrated control and monitoring system that monitors at least one parameter selected from FCC operating parameters, feed rate, feedstock properties, and product stream properties, and adjusts at least one parameter in
(Continued)

response to the measured parameter to increase production of desulfurized products.

15 Claims, 4 Drawing Sheets

Related U.S. Application Data continuation-in-part of application No. 11/983,078, filed on Nov. 7, 2007.

(60) Provisional application No. 60/857,300, filed on Nov. 7, 2006.

(51) Int. Cl.
| | |
|---|---|
| C10G 11/05 | (2006.01) |
| G05B 13/02 | (2006.01) |
| G05B 17/02 | (2006.01) |
| G05D 21/02 | (2006.01) |
| B01J 29/08 | (2006.01) |
| B01J 29/40 | (2006.01) |
| B01J 29/89 | (2006.01) |

(52) U.S. Cl.
CPC .......... *G05B 13/027* (2013.01); *G05B 17/02* (2013.01); *G05D 21/02* (2013.01); *B01J 29/084* (2013.01); *B01J 29/088* (2013.01); *B01J 29/40* (2013.01); *B01J 29/89* (2013.01); *C10G 2300/1033* (2013.01); *C10G 2300/1044* (2013.01); *C10G 2300/1059* (2013.01); *C10G 2300/1074* (2013.01); *C10G 2300/202* (2013.01); *C10G 2300/4081* (2013.01); *C10G 2300/4093* (2013.01); *C10G 2400/02* (2013.01)

(58) Field of Classification Search
USPC .............................. 208/113, 114, 121, 208 R
See application file for complete search history.

(56) References Cited

U.S. PATENT DOCUMENTS

| | | | |
|---|---|---|---|
| 3,213,014 | A | 10/1965 | Atkinson |
| 3,629,097 | A | 12/1971 | Smith |
| 3,728,526 | A | 4/1973 | Youngblood |
| 3,828,171 | A | 8/1974 | Griffin |
| 4,092,722 | A * | 5/1978 | Hofferber et al. ............ 700/273 |
| 4,243,630 | A | 1/1981 | Kliesch et al. |
| 4,345,993 | A | 8/1982 | Stewart |
| 4,354,957 | A | 10/1982 | Swindell et al. |
| 4,419,221 | A | 12/1983 | Castagnos, Jr. et al. |
| 4,437,977 | A | 3/1984 | Funk |
| 4,532,026 | A | 7/1985 | Fries |
| 4,929,337 | A | 5/1990 | Herbst et al. |
| 4,980,053 | A | 12/1990 | Li et al. |
| 5,073,349 | A | 12/1991 | Herbst et al. |
| 5,298,155 | A | 3/1994 | Sabottke |
| 5,322,619 | A | 6/1994 | Davis et al. |
| 5,326,465 | A | 7/1994 | Yongqing et al. |
| 5,389,236 | A * | 2/1995 | Bartholic et al. ............ 208/152 |
| 5,402,333 | A * | 3/1995 | Cardner ........................ 700/31 |
| 5,462,652 | A | 10/1995 | Wegerer |
| 5,774,381 | A | 6/1998 | Meier |
| 5,846,402 | A * | 12/1998 | Mandal et al. ............... 208/113 |
| 5,904,837 | A | 5/1999 | Fujiyama |
| 5,951,850 | A | 9/1999 | Ino et al. |
| 6,045,690 | A | 4/2000 | Fujiyama et al. |
| 6,093,867 | A | 7/2000 | Ladwig et al. |
| 6,566,293 | B1 * | 5/2003 | Vogt et al. .................... 502/67 |
| 6,656,346 | B2 * | 12/2003 | Ino et al. .................. 208/120.01 |
| 6,835,302 | B2 | 12/2004 | Cammy et al. |
| 6,852,214 | B1 * | 2/2005 | Chester et al. ............... 208/113 |
| 7,122,495 | B2 | 10/2006 | Ou et al. |
| 7,145,051 | B2 | 12/2006 | Ou et al. |
| 2002/0195373 | A1 | 12/2002 | Ino et al. |
| 2003/0065408 | A1 | 4/2003 | Quinones et al. |
| 2004/0099572 | A1 | 5/2004 | Evans |
| 2004/0215697 | A1 | 10/2004 | Vergopoulos et al. |
| 2005/0209093 | A1 | 9/2005 | Chester et al. |
| 2005/0261534 | A1 | 11/2005 | Stell et al. |
| 2006/0074571 | A1 | 4/2006 | Evans |
| 2006/0178546 | A1 | 8/2006 | Mo et al. |
| 2006/0260981 | A1 | 11/2006 | Gosling |
| 2007/0032374 | A1 | 2/2007 | Lau et al. |
| 2007/0227351 | A1 | 10/2007 | Garcia-Martinez |
| 2007/0299619 | A1 | 12/2007 | Marik et al. |
| 2008/0078694 | A1 | 4/2008 | Sexton et al. |
| 2009/0095657 | A1 | 4/2009 | Taha et al. |
| 2010/0025297 | A1 | 2/2010 | Vierheilig |

FOREIGN PATENT DOCUMENTS

| | | | |
|---|---|---|---|
| JP | 7506389 | | 7/1995 |
| JP | 2002241764 | A | 8/2002 |
| WO | 2004065005 | A1 | 8/2004 |
| WO | WO 2005/095549 | * | 10/2005 |
| WO | 2006050487 | A | 5/2006 |
| WO | 2008057546 | A9 | 5/2008 |

OTHER PUBLICATIONS

International Search Report and Written Opinion issued in PCT Application No. PCT/US11/37182 dated Aug. 16, 2011 (13 pages).
"FCCU advanced control", Hydrocarbon Processing, Feb. 1986, pp. 71-74, vol. 65, No. 2, Houston, TX, USA.
S. S. Al-Alloush, Gene Yeh, A. M. Aitani, "Overview of catalyst management and selection protocols at Saudi Aramco refineries", SA Journal of Technology 2006.
T. Chakravarty, M. R. Khan, H. L. C. Meuzelaar, "Modeling and Predicting the Composition of Fossil Fuel Derived Pyrolysis Liquids by Using Low-Voltage Mass Spectrometry and Canonical Correlation Analysis", 1990, pp. 2173-2180, vol. 29, Ind. Eng. Chem. Res.
T. Chakravarty, W. Windig, G. R. Hill, H. L. C. Meuzelaar, "Time-Resolved Pyrolysis Mass Spectrometry of Coal: A New Tool for Mechanistic and Kinetic Studies", Energy & Fuels, 1988, pp. 400-405, vol. 2.
M. R. Khan, K. H. Kumar, "Pseudocomponent Model for Prediction of Molecular Weight Distribution of Pyrolysis Liquids Generated at Slow and Rapid Heating Rate Reactors", Energy & Fuels, 1989, pp. 312-315, vol. 3.
M. R. Khan, "Correlations between Physical and Chemical Properties of Pyrolysis Liquids Derived from Coal, Oil Shale, and Tar Sand", Energy & Fuels, 1988, pp. 834-842, vol. 2.
A. Chica, K. G. Strohmaier, E. Iglesia, "Effects of zeolite structure and aluminum content on thiophene adsorption, desorption, and surface reactions", Applied Catalysis B: Environmental, 2005, pp. 231-240, vol. 60.
International Search Report for PCT/US2009/063410 dated Feb. 26, 2010.
International Search Report for PCT/US2007/023405 dated Jan. 12, 2009.
White, D. C., "Creating the 'smart plant'", Hydrocarbon Processing, Oct. 2003, pp. 41-50, vol. 82, No. 10, XP-002507804.
Haurani et al., "Multivariable Control of a Paper Coloring Process: a Case Study", Proceedings of the American Control Conference, Arlington, VA, Jun. 25-27, 2001, pp. 2210-2215.
Taha et al., "Detection and Diagnosis of Oscillations in Control Loops", Proceedings of the 35th Conference on Decision and Control, Kobe, Japan, Dec. 1996, pp. 2432-2437.

* cited by examiner

CONTROL OF FLUID CATALYTIC CRACKING PROCESS FOR MINIMIZING ADDITIVE USAGE IN THE DESULFURIZATION OF PETROLEUM FEEDSTOCKS

CROSS REFERENCE TO RELATED APPLICATIONS

This application is a continuation-in-part of U.S. patent application Ser. No. 12/266,197, filed on Nov. 6, 2008, which is a continuation-in-part of U.S. patent application Ser. No. 11/983,078, filed on Nov. 7, 2007, which claims priority to U.S. Provisional Patent Application No. 60/857,300, filed on Nov. 7, 2006, the disclosures of which are each incorporated by reference in their entirety.

FIELD OF THE INVENTION

This invention relates to a method and apparatus for catalytic cracking of petroleum oil. More particularly, it relates to the application of appropriate control and monitoring conditions to a fluid catalytic cracking ("FCC") unit or process operating at relatively high severity conditions, wherein the process includes the cracking and desulfurization of petroleum oil to obtain a maximum yield of light higher value products, for example low sulfur gasoline, and maximizing products desulfurization per unit of hydrocarbon feed.

BACKGROUND OF THE INVENTION

Steam pyrolysis is a widely practiced process for cracking petroleum oil, however, it is energy intensive, not very selective, produces coke and releases significant amounts of carbon dioxide into the air. Thus, chemical manufacturers have long recognized a need for an alternative hydrocarbon cracking process. One alternative to the steam pyrolysis process is catalytic cracking.

Government regulations have been and are currently being introduced throughout the world to reduce the sulfur content in gasoline. In most refineries, the fluid catalytic cracking (FCC) process is the major contributor of sulfur to the refinery gasoline pool. While there is a significant amount of research currently being done to improve desulfurization catalysts, there also exists a need to improve refinery processes to achieve a desulfurized gasoline at greater yields and improved efficiencies and costs.

Typical FCC processes provide multiple product streams, including fuel gas, gasoline, light cycle oil, heavy cycle oil and coke. While a major portion of the sulfur that is originally present in the feedstock exits the FCC process as hydrogen sulfide in the fuel gas fraction, the gasoline fraction can also include significant amounts of sulfur.

In a typical catalytic cracking unit, petroleum-derived hydrocarbons are catalytically cracked in the presence of a catalyst to obtain gasoline as the main product, a small amount of LPG, and cracked gas oil. Coke is deposited on the catalyst and is then burnt away with air to regenerate the catalyst, thereby allowing the catalyst to be recycled to the reaction zone for reuse in the process. In a typical refinery, between 30% and 50% of the refinery gasoline production comes from an FCC unit. This stream is typically also responsible for up to about 90% of the sulfur present in gasoline.

In a typical FCC process, light higher value products can typically be selectively increased by increasing the reaction zone temperature, which in turn causes an increase in the contribution of thermal cracking and leads to increased production of lighter products. Known FCC methods, however, typically do not selectively produce sufficient amounts higher value light-fraction products. For example, the high-temperature cracking reaction of the FCC process typically will also result in the thermal cracking of petroleum oils, thereby increasing the yield of dry gases from feedstock oils. For example, in one specific type of FCC process, referred to as a Deep Catalytic Cracking ("DCC"), higher temperatures and increased amounts of steam are used. Thermal cracking in the DCC process, however, is less selective and produces large amounts of relatively low value products, such as hydrogen, methane, ethane, and ethylene, in the "wet gas" (which also contains the $H_2$ and C1-C4 products). Wet gas compression often limits subsequent refinery operation.

MOM Thiophene, benzothiophene, and alkyl derivatives thereof, are among the most abundant organosulfur compounds found in gasoline, generally accounting for more than 80% of the total sulfur that is present in the gasoline fraction. It is these sulfur containing compounds, rather than the sulfides, disulfides and mercaptans, that typically remain after desulfurization processes. The presence of organosulfur compounds in gasoline products typically result in toxic emissions and inefficient performance of exhaust catalysts.

Attempts to reduce sulfur in gasoline produced from an FCC unit have various drawbacks. For example, reducing the end boiling point of the gasoline stream (known as "undercutting") can reduce the overall sulfur content of the fraction, however this also results in a reduction of gasoline yield, loss of motor octane number (MON), and a reduction in the cetane number of the light cycle oil (LCO). Similarly, hydrotreatment of the FCC petroleum feedstock is an option for removal of sulfur, however this treatment typically involves substantial capital expenditures and typically results in olefin saturation and reduction of the MON.

Additional methods have been designed to produce low sulfur gasoline and some drawbacks associated with them include the following. Selective adsorption of sulfur containing compounds can be carried out at low temperatures, in an attempt to avoid the saturation of alkenes and arenes, which typically prevail during hydrodesulfurization catalysis. However, available processes based on existing catalyst materials have shown limited adsorption capacities and selectivities for thiophenes, which represents a particular challenge with respect to desulfurization.

The reaction of feed oil and a catalyst over a short contact time causes a decrease in the conversion of higher value light-fraction products to light-fraction paraffins, believed to be due to the inhibition of hydrogen transfer reactions. During reactions having a short contact time, the conversion of petroleum oils to light-fraction oils is typically not greatly increased. Furthermore, the use of pentasil-type zeolites can enhance the yield of light-fraction hydrocarbons by excessive cracking of the gasoline once it is produced. Therefore, it is difficult to produce a high yield of the higher value light-fraction products from heavy fraction oils by using either of these known techniques. Thus, there is a need to develop new methods to optimize production conditions where the reaction time is optimized with a view to produce certain desired end products.

In general, a major difficulty with the FCC process is that, in designing the process, the operator seeks to maximize the reactor and stripper temperatures, while at the same time seeking to minimize the regenerator temperature. Controlling the temperatures of both of the devices during this process in this manner does not effectively occur in conventionally heat balanced operations because any increase in the reactor temperature essentially leads to a subsequent increase in the regenerator temperature, thereby resulting in a heat imbalance. Therefore, a need exists for appropriate control systems that allow appropriate heat-balances in a FCC unit.

Additionally, in typical FCC processes, control of the FCC catalyst and FCC additive usage is typically manually augmented during the refining process to control the emissions and product mix. In other words, there are currently no systematic feedback mechanisms for optimizing FCC processes, thus requiring for manual control of the process by an operator. Thus there exists a need for methods to monitor and optimize FCC catalyst and FCC additive usage during processing.

Due to the uncertainties of the chemical composition of feedstocks that can be supplied to the FCC unit, both the emissions from the process and the product mixture may vary from the desired target emissions and product mixture over the course of the refining process. As a result, system operators are typically required to closely monitor the system outputs and be constantly available to make manual adjustments to the FCC catalyst and FCC additive injection schedules and other operating parameters, as needed. Operating the FCC unit in this manner, where the operator is required to constantly manually monitor the process and make adjustments thereto, poses a significant challenge when the system is being operated under severe conditions. Thus, a need exists to provide a method for remotely monitoring and controlling the overall FCC process and allowing process models to predict necessary adjustments to the catalyst injection schedule based upon system outputs, while at the same time reducing the reliance on human interactions, such as monitoring and making manual changes to the catalyst injection schedule.

Moreover, current FCC units and processes do not necessarily model and optimize process variables for maximizing conversion of feedstocks to low-sulfur gasoline and minimizing FCC catalyst and FCC additive usage, particularly when the FCC unit is operated at a severe mode. Therefore, a need exists for an automated process for the optimization of the unit and adjustment of various process variables, such as feed rate, feed quality, set of processing objectives and FCC catalyst and FCC additive usage and selection based upon other unit constraints (e.g., wet gas compressor capacity, fractionation capacity, air blower capacity, reactor temperature, regenerator temperature, catalyst circulation).

SUMMARY

The current invention provides a method and device for the high yield production of desulfurized gasoline products from an FCC unit, and corresponding low or reduced usage of FCC additives.

In one aspect, a method for the fluid catalytic cracking of petroleum oil feedstock to produce a low-sulfur full range gasoline product stream is provided. The method includes the steps of: feeding petroleum oil feedstock to a reaction zone of a fluid catalytic cracking unit, and feeding a base cracking catalyst to the reaction zone of the fluid catalytic cracker. The base cracking catalyst can include a stable Y-type zeolite and less than about 0.6% by weight of rare-earth metal oxide. The method also includes the step of feeding a fluid catalytic cracking additive to the reaction zone of the fluid catalytic cracker, wherein the fluid catalytic cracking additive includes a shape-selective zeolite, and wherein the average pore size of the shape-selective zeolite is smaller than the average pore size of the base cracking catalyst. The base cracking catalyst and the fluid catalytic cracking additive are present in an amount of between about 55 to 95% by weight of the base cracking catalyst and between 5 and 45% by weight of the additive. The base cracking catalyst and the fluid catalytic cracking additive are each added separately to the reaction zone of the fluid catalytic cracking unit. The method also includes the step of contacting the petroleum oil feedstock, the fluid catalytic cracking additive, and the base cracking catalyst in the reaction zone of the fluid catalytic cracking unit for a reaction zone contact time of between about 0.05 and 3 seconds to obtain a mixed hydrocarbon stream. The mixed hydrocarbon stream includes a desulfurized hydrocarbon product stream, unreacted petroleum oil feedstock, and spent catalyst. The reaction zone is maintained at a temperature of between about 500° C. and 630° C. The method includes the step of separating and collecting the desulfurized hydrocarbon product stream from the spent catalyst and unreacted petroleum oil feedstock, and separating the desulfurized hydrocarbon product stream to produce a full-range low-sulfur gasoline product stream. The method includes the step of controlling the feed rates of the petroleum oil feedstock, the base cracking catalyst, and the fluid catalytic cracking additive to the reaction zone with a process control. The step of controlling the feed rates includes the steps of: continuously monitoring and collecting data corresponding to the composition of the petroleum oil feedstock, the composition of the full-range low-sulfur gasoline product stream, the feed rates of the base cracking catalyst and the fluid catalytic cracking additive, and operating conditions of the fluid catalytic cracking unit; providing the data corresponding to the petroleum oil feedstock, the low-sulfur gasoline product stream, the feed rates of the base cracking catalyst and the fluid catalytic cracking additive, and the operating conditions of the fluid catalytic cracking unit to the process control and comparing the results against historical data; and adjusting feed rate of the fluid catalytic cracking additive to optimize at least one of the following: desulfurization of the petroleum oil feedstock, fluid catalytic cracking additive usage, or FCC gasoline production.

The method can further include the steps of: determining the sulfur content in the low-sulfur gasoline product stream; adjusting at least one parameter selected from a rate of feed of the petroleum oil feedstock to the reaction zone of the fluid catalytic cracking unit, the fluid catalytic cracker unit reaction zone temperature, or the reaction zone contact time between the petroleum oil feedstock and the catalyst mixture to achieve an adjusted operating condition; and determining the sulfur content of the full-range low-sulfur gasoline product stream when the fluid catalytic cracking unit is operating under the adjusted operating condition.

The method can further include the steps of determining an initial real-time sulfur content in the low-sulfur gasoline product stream; calculating a simulated sulfur content in the low-sulfur gasoline product stream based upon the adjustment of at least one operating parameter, wherein the at least one operating parameter is selected from a feed rate of the petroleum oil feedstock to the reaction zone of the fluid catalytic cracking unit, a feed rate of the base cracking catalyst to the reaction zone, the feed rate of the fluid catalytic cracking additive to the reaction zone, the temperature of the reaction zone of the fluid catalytic cracker unit, or the contact time between the petroleum oil feedstock and the cracking catalyst composition; repeating the step of calculating a simulated sulfur content until a maximum simulated desulfurization is achieved; comparing the maximum simulated desulfurization with the an initial sulfur content in the full-range low-sulfur gasoline product stream; and if the sulfur content in the maximum simulated desulfurization is less than the initial sulfur content in the full-range low-sulfur gasoline product stream, then adjusting at least one operating parameter to reduce sulfur content of the full-range low-sulfur gasoline product stream.

In another aspect, a system for producing a low-sulfur gasoline from a petroleum oil feedstock by a fluid catalytic cracking process is provided. The system includes a first computer, a fluid catalytic cracking unit, a plurality of sensors positioned within the fluid catalytic cracking unit, a controller, and at least one peripheral program. The at least one peripheral program is selected from an on-line performance monitoring module, a model predictive control, a selection of process model, a fluid catalytic cracking unit profit and energy cost calculation module, and a power management system module, wherein the first computer is configured to receive signals from at least one sensor positioned within the fluid catalytic cracking unit and to send and receive instructions to and from the fluid catalytic cracking unit and the at least one peripheral program. A computer program is associated with the first computer, the fluid catalytic cracking unit, and the at least one peripheral program, wherein the computer program is stored on a tangible computer memory media and operable on the first computer, the computer program product including a set of instructions that, when executed by the computer, cause the computer to perform the operations of: receiving, by the computer, a signal from at least one sensor positioned within the fluid catalytic cracking unit, said signal from the fluid catalytic cracking unit being related to a physical property of either the petroleum oil feedstock or a gasoline product stream; sending a signal from the computer to at least one peripheral program, responsive to the computer receiving the signal from the at least one sensor positioned within the fluid catalytic cracking unit, receiving, by the at least one peripheral program, a signal from the computer, wherein the signal relates to a physical property of either the petroleum oil feedstock or the gasoline product stream; analyzing and processing by the at least one peripheral program the signal from the computer to produce a first instruction for operation of the fluid catalytic cracking unit, wherein said first instruction from the at least one peripheral program is designed to improve the performance of the fluid catalytic cracking unit by achieving at least one improvement selected from the group consisting of increasing yield of the gasoline product, decreasing the sulfur content of the gasoline product, and decreasing fluid catalytic cracking additive usage of the fluid catalytic cracking unit; communicating by the peripheral a first instruction to the computer; and communicating by the computer to the fluid catalytic cracking unit the first instruction, wherein the first instruction provides instruction to the fluid catalytic cracking unit to adjust the operating conditions by at least one of the following operations: operating a valve, actuating an actuator, adjusting the temperature of the fluid catalytic cracking unit, or adjusting the pressure of the fluid catalytic cracking unit.

In another aspect, a method for the fluid catalytic cracking of a petroleum oil feedstock to produce a full range low sulfur gasoline product stream is provided. The method includes the step of feeding the petroleum oil feedstock to a reaction zone of a fluid catalytic cracking unit, the reaction zone including a mixture of between about 55 to 95% by weight of a base cracking catalyst and between about 5 to 45% by weight of a fluid catalytic cracking additive, and up to about 10% by weight of a phosphorous containing compound, wherein the base cracking catalyst includes a stable Y-type zeolite and up to about 0.6% by weight of rare-earth metal oxide; and wherein the fluid catalytic cracking additive includes a shape-selective zeolite. The method includes contacting the mixture and petroleum oil feedstock in the fluid catalytic cracking unit reaction zone for a reaction zone contact time of between about 0.005 and 3 seconds to produce a mixed hydrocarbon stream, wherein the fluid catalytic cracking unit reaction zone is maintained at a temperature of between about 500° C. and 650° C., and wherein said mixed hydrocarbon stream comprises a treated hydrocarbon product. The method includes separating the treated hydrocarbon product stream from unreacted petroleum oil feedstock; and collecting a treated hydrocarbon product stream. The addition of petroleum oil feedstock, base cracking catalyst and fluid catalytic cracking additive to the reaction zone are controlled by a distributed control system, the distributed control system comprising at least one computer and at least one peripheral program, the distributed control system configured to perform the steps of: continuously monitoring the composition of the petroleum oil feedstock, the composition of the treated hydrocarbon product stream, and the operating conditions the fluid catalytic cracking unit; developing process models based on the composition of the petroleum oil feedstock, the composition of the treated hydrocarbon product stream and the operating conditions the fluid catalytic cracking unit, wherein the process models are operable to optimize operating conditions for the fluid catalytic cracking unit and to produce a treated hydrocarbon product stream having a reduced sulfur content; comparing the performance of the fluid catalytic cracking unit with the process models; and adjusting the operating conditions of the fluid catalytic cracking unit to provide a treated hydrocarbon product stream having a reduced sulfur content.

In another aspect, a method for the fluid catalytic cracking of petroleum oil feedstock is provided. The method includes the steps of feeding the oil feedstock into a reaction zone of a fluid catalytic cracking unit, said reaction zone including a cracking catalyst mixture. The cracking catalyst mixture includes about 55 to 95 wt % of a base cracking catalyst that includes a stable Y-type zeolite and less than 0.6 wt % of rare-earth metal oxide; about 5 to 45 wt % of an additive that includes a shape-selective zeolite; and up to about 10% by weight of a phosphorus-containing compound. The method further includes the steps of reacting the cracking catalyst mixture and oil feedstock in a reaction zone of the fluid catalytic cracking unit that is maintained at a temperature of between about 500° C. and 650° C. and a contact time of between about 0.05 and 3 seconds, to obtain a mixture, wherein the mixture includes a product stream, unreacted oil feedstock and spent catalyst; and separating and collecting the product stream from the spent catalyst and unreacted oil feedstock. The addition of oil feedstock and catalyst to the reaction zone is controlled by a process control system. The process control system includes at least one computer and at least one peripheral program and is configured to perform the steps of: continuously monitor the composition of the petroleum oil feedstock, the composition of the gasoline product stream and the operating conditions the fluid catalytic cracking unit; develop process models based on the petroleum oil feedstock, the composition of the gasoline product stream and the operating conditions the fluid catalytic cracking unit, wherein the process models are configured to provide operating conditions for the fluid catalytic cracking unit and a reduced sulfur content product stream;

compare performance of the fluid catalytic cracking unit with the process models; and adjust operating conditions to yield increase desulfurization of the petroleum oil feedstock.

DETAILED DESCRIPTION OF THE INVENTION

Figure 1:
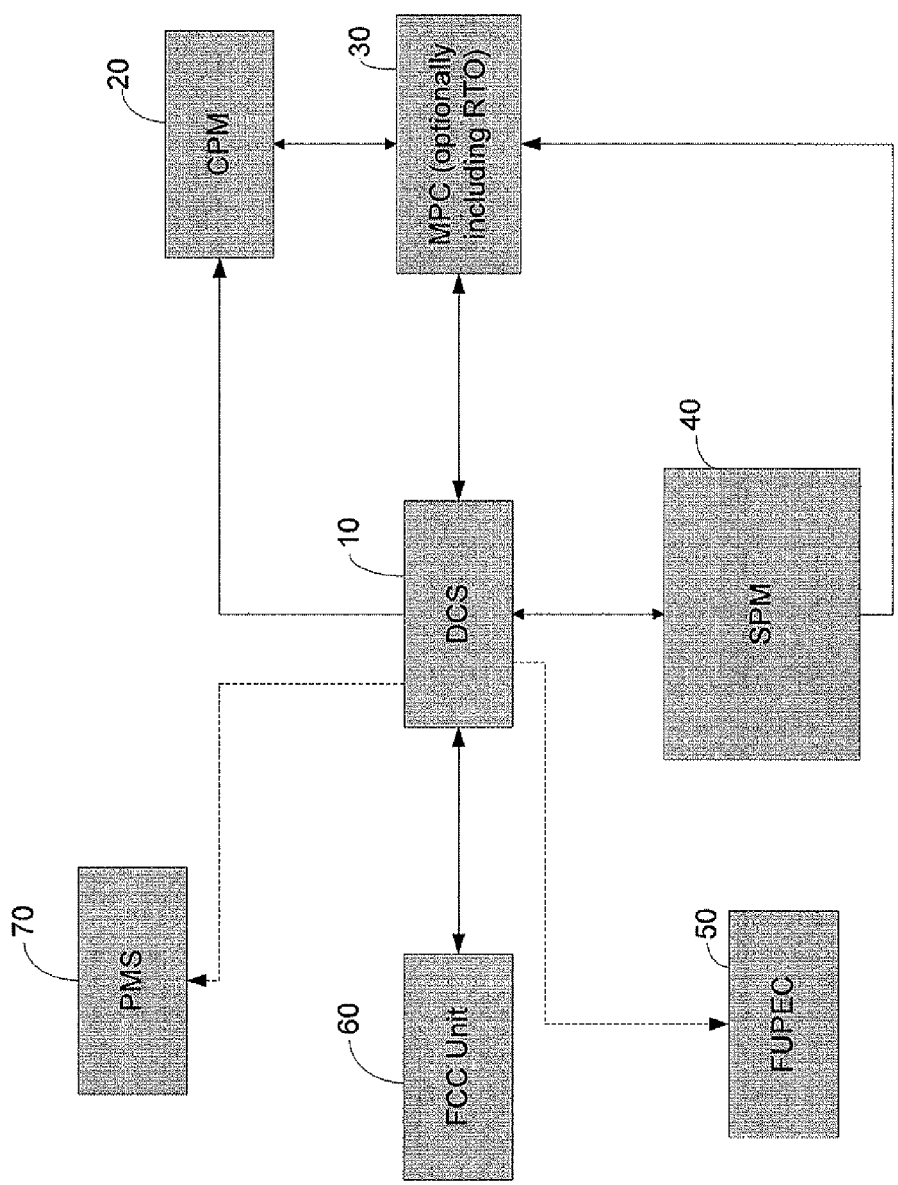
FIG. 1 is a diagram of an embodiment of a process for upgrading a petroleum feedstock according to the present invention.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein are set forth without any loss of generality to, and without imposing limitations thereon, the claimed invention.

Some of the general process considerations taken into account during the processing of petroleum oil based feeds in the preparation of a low sulfur FCC gasoline include at least the following: maximizing octane retention in the final product, minimizing hydrogen consumption during the hydrodesulfurization process, reliability and lifetime of the catalyst, FCC additive usage, and overall cost, including costs based upon energy consumption. In certain embodiments, the catalyst selection can affect a number of parameters of the product stream, for example the olefin content, and in certain embodiments, can allow for certain properties the product to be controlled.

The prior art FCC systems and methods for operating FCC units are directed to systems that focus on the overall production of gasoline, and therefore are not directed to the optimized production of light higher value products, such as low-sulfur gasoline, nor are they directed at minimizing usage of FCC catalyst and FCC additives. Therefore, in one aspect, the present invention is directed to a process for producing a low sulfur gasoline, wherein usage of FCC additives is minimized. In particular, the present invention is directed to the desulfurization of light higher value products. As described herein, an FCC unit that has been modified for the desulfurization of various hydrocarbon products can be utilized to produce light-fraction higher value products. Utilization of such an FCC unit can also be economically advantageous, particularly in an oil refinery which is highly integrated with other industrial petrochemical processes, and where the desulfurization of the feedstock by the FCC unit can simultaneously reduce or eliminate the need for additional downstream desulfurization processes and equipment. In certain embodiments, an FCC unit utilizing the optimization and control aspects of the present invention can be integrated with a petrochemical production unit that processes olefins. The reduction of sulfur content of the gasoline can also result in the desulfurization of olefins that are utilized for an associated process. In addition, the integration of addition petrochemical processing, treatment and production can maximize heat integration and minimize product loss.

Zeolitic materials, such as ZSM-5, are known for use as hydrocarbon conversion catalysts. In one aspect, present invention is directed to the use of a combination of zeolitic catalyst systems designed to selectively crack hydrocarbon materials to produce light higher value products, wherein the use of the zeolitic catalyst system includes introducing an advanced control system to optimize catalysts flow into the reactor. The system can also utilize various sensors to monitor in-line feed rate and composition, and/or output composition. The advanced control system also can utilize statistical models to increase overall desulfurization of the products or product yields. The control systems and sensors, in combination with desulfurization catalysts, creates a unique and cost effective manner for the desulfurization of gasoline in FCC units and processes. In certain embodiments, the advanced control system can be used to decrease or minimize FCC catalyst and/or FCC additive usage.

Zeolites are also potential candidates for thiophene adsorption, due to their crystalline framework structure, high specific area, and their structural and compositional flexibility. For example, thiophenes adsorb on H-ZSM-5 with modest selectivity relative to benzene. ZSM-5 samples having high aluminum content showed high adsorption capacities for both thiophene and alkyl-thiophenes, thus indicating specific interactions with aluminum sites and possible acid catalyzed alkylation reactions with alkenes or other components to form larger organosulfur compounds.

In another aspect, a method to selectively increase the yield of light higher value products includes the uses of a higher value products-selective zeolite-containing FCC additive with the catalyst for the FCC process, such as an FCC additive that includes the zeolite ZSM-5. Additives such as ZSM-5 can, in certain embodiments, selectively convert primary cracking products (e.g., higher value gasoline products) to C3 and C4 higher value products. In certain embodiments, the effectiveness of the ZSM-5 can be increased by the addition of phosphorous, the presence of which has been shown to increase the activity or selectivity of the catalyst. Typically, FCC additives are more expensive than the catalyst, frequently substantially more expensive than the catalyst, and in certain embodiments, the present invention is directed to methods for decreasing and/or minimizing the usage of FCC catalyst additives. In alternate embodiments, the present invention provides an FCC catalyst composition for use with the methods described herein wherein the FCC catalyst composition for reducing the sulfur content of FCC gasoline, which includes an FCC catalyst and an FCC additive. In certain embodiments, the catalyst composition can include a catalyst support material and a Lewis acid component.

Certain FCC additives are expensive, relative to FCC catalysts. For example, certain FCC additives can be up to ten times, twenty times or even thirty times more expensive than a corresponding FCC catalyst. Because of the high cost of the FCC additive, in certain embodiments, the present invention is directed to the use of the FCC additive, and more specifically to the reduced use of the FCC additive relative to the catalyst, and to the corresponding cost savings. In other embodiments, the invention is directed to optimized desulfurization of the FCC gasoline product, including minimizing usage of the FCC additive.

In one aspect, the invention relates to certain FCC processes that are designed to maximize production of light higher value products, particularly low-sulfur gasoline, while at the same time minimizing FCC additive usage. The inventive FCC process can include the use of an FCC cracking catalyst that includes both large and medium pores, an FCC additive shape-selective zeolite component, and the use of advanced process control and optimization systems. The FCC feed is catalytically cracked to produce a cracked material that includes naphtha and low-sulfur gasoline. The process can also include recovery and the subsequent recycle of at least a portion of the cracked hydrocarbon material as a feed, wherein the cracked hydrocarbon material can be further catalytically cracked under relatively severe operating conditions into products, including additional low-sulfur gasoline. In this manner, the overall product desulfurization per unit of hydrocarbon feed can be maximized, by using the advanced process control.

In another aspect, the invention includes an improved FCC process for cracking of petroleum oil utilizing process automation and control, which can produce light-fraction higher value products with a high yield, while at the same time producing a decreased amount of dry gases, such as gaseous hydrogen, methane, and ethane, which are generated by the thermal cracking of the oil. This can be achieved through the use of a downer reactor or down-flow or riser FCC reactor to reduce back mixing, which can be a primary cause of over-cracking, which can subsequently result in the formation of a large amount of dry gas. The reduction of back mixing reduces both coke and dry gas formation, resulting in increased production of low-sulfur gasoline.

To raise the yield of light-fraction higher value products, fluid catalytic cracking of a petroleum oil feedstock can be performed by contacting the petroleum oil with an additive/catalyst mixture at a high temperature and at a short contact time. The additive/catalyst mixture preferably includes a base FCC catalyst and an FCC additive that includes a shape-selective zeolite. The application of advanced control systems to maximize products desulfurization with minimum costs can be integrated as part of the FCC process to reduce overall FCC additive usage, while at the same time maintaining production of a full range FCC gasoline product.

In another embodiment, a method for increasing the yield of valued added products, such as a low-sulfur gasoline, is provided. In general, in one embodiment the method provides a process for the fluid catalytic cracking of petroleum oil at a high temperature and at a short catalyst contact time, wherein the petroleum oil is contacted with an additive/catalyst mixture that includes of a base cracking catalyst and an FCC additive containing a shape-selective zeolite.

In yet another embodiment, the present invention utilizes rigorous statistical models to facilitate automation of the control systems to optimize product yield, product desulfurization, FCC catalyst usage, and/or FCC additive usage.

Feedstock

In one aspect of the present invention, improved fluid catalytic cracking of petroleum oil feedstock to produce high yields of low or reduced sulfur gasoline is provided. As used herein, petroleum oil includes straight-run gas oil, vacuum gas oil, atmospheric residue, vacuum residue, coker gas oil, and various other petroleum oils that are obtained by the hydrorefining or hydrotreating of atmospheric residues and gas oils, and mixtures thereof.

In general, the feed to the FCC unit is catalytically cracked in the presence of an FCC catalyst and an FCC additive to produce a cracked hydrocarbon material, which can include naphtha and gasoline, wherein the naphtha and gasoline have reduced sulfur content. In certain embodiments, at least a portion of the naphtha and gasoline can be recovered from the FCC unit and recycled as feed to a reactor, such as a downer, for further cracking into products, including additional low-sulfur gasoline. The recycle of at least a portion of the naphtha and gasoline to the downer can include the entire naphtha fraction, which can be useful for the production of additionally low-sulfur gasoline-containing light higher value products, as well as various naphtha fractions.

The feed to the FCC unit can include heavy oil or residue, which can be more difficult to crack, as compared to a naphtha feedstock. For example, a heavy oil or residue typically requires a higher temperature during cracking. In general, the production of higher value products from a heavy oil or residue, rather than paraffinic naphtha, is difficult and requires high temperature. The current invention, however, can be used to effectively process such feeds.

In certain embodiments, a lower cat naphtha fraction can be separated from a full boiling range FCC gasoline prior to desulfurization, and the lower cat naphtha fraction can be utilized as the feed to the FCC unit. Generally, contacting the naphtha feedstock with a desulfurization catalyst can result in octane loss, due in part to the higher olefin content. As used herein, naphtha refers to a hydrocarbon fraction that includes between about three and twenty carbon atoms, typically having a boiling point range of between about 36° C. and 221° C. The heavy naphtha (i.e., having a boiling point between about 180° C. and about 221° C.) can be recycled and treated under more severe conditions (i.e., higher temperature). In certain embodiments, the lower cat naphtha fraction can include both paraffinic and isoparaffinic hydrocarbons having between about four to about eleven carbon atoms per molecule. The heavy naphtha fraction can include hydrocarbons having greater than 12 carbon atoms.

Additional hydrocarbon feedstocks can include gas oil having a boiling range between about 260° C. and 340° C., or fuel oils having a boiling point greater than about 340° C. In certain embodiments, a residue or corresponding hydrotreated material can serve suitable feedstocks for the FCC unit.

The hydrocarbon feedstock can include sulfur containing compounds, as is the case with most hydrocarbon oils include at least a minimal sulfur concentration, depending on different pretreatment and processing to which the feedstock may be subjected. In certain embodiments, the hydrocarbon feedstock has a sulfur content of less than about 1% by weight. In one aspect of the present invention, sulfur containing hydrocarbons are converted into value added products, such as low-sulfur gasoline, by cracking with an FCC unit.

Catalyst Composition

The catalyst compositions utilized in the present invention are preferably suitable for desulfurization of the petroleum feedstock. Exemplary catalysts that can be used in the present invention include amorphous zeolitic materials that may include alumina, and optionally may include metals for sulfur reduction. Generally, the metals that are included in the catalyst are selected from the transition metals, particularly metals from groups IVB, VB, VIB and VIIIB of the periodic table, however in certain embodiments the catalyst can also include a rare earth metal selected from the lanthanide and actinide series of the periodic table. Rare earth metals frequently can be incorporated into a zeolite structure to stabilize aluminum or other atoms that may be present. Exemplary desulfurization catalysts can include cobalt sulfides or molybdenum sulfides.

In certain embodiments, the catalyst can include a pentasil zeolite catalyst. As used herein, pentasil zeolite catalysts include chains that are interconnected by oxygen bridges to form corrugated sheets. In certain embodiments, the catalyst can include any catalyst conventionally used in FCC processes, such as zeolites, silica-alumina, carbon monoxide burning promoter additives, bottoms cracking additives, light olefin-producing additives, and/or any other catalyst additive that is routinely used in FCC processes. In certain embodiments, the cracking zeolites used in the FCC process are selected from the group consisting of: Y, REY, USY, and RE-USY. In certain embodiments, for enhanced naphtha cracking potential, a preferred shape selective catalyst additive, such as those catalysts typically used in FCC processes to produce light olefins and to increase FCC gasoline octane (such as, a ZSM-5 zeolite crystal or other pentasil type catalyst structure) can be employed. In these embodiments, the ZSM-5 additive can be mixed with a cracking catalyst zeolite and matrix structures typically employed in conventional FCC catalyst to maximize and optimize paraffinic naphtha cracking in the reactor.

The zeolite type, pore size distribution, relative matrix to total surface area, and chemical composition (i.e., the physical and chemical properties of the catalyst) individually and collectively contribute to the selectivity and conversion properties of the catalyst, as well as to the required catalyst to feed ratios and average lifetime for the catalyst. In general, desulfurization of a feedstock using an FCC unit that includes a large pore zeolite cracking catalyst designed to desulfurize the feedstock can produce larger amounts of value added products. The addition of a cracker riser/downer to the FCC unit and/or the addition of a medium pore zeolite catalytic component to the FCC unit can further increase the production of the valued added products. In certain embodiments, additional value added products can produced by recycling at least a portion of the hydrocarbon material cracked in the FCC unit back to the cracker riser/downer of the FCC unit. In one exemplary embodiment, the large pore size zeolite can be a USY zeolite and the medium pore size zeolite can be ZSM-5, both of which are commercially available. Exemplary sulfur reduction FCC additives that are commercially available include Albemarle, BASF, CCIC, Englehard, Grace Davidson, and Intercat, and are typically labeled as comparative additives (10% by weight) to a steamed, conventional FCC zeolite catalyst, such as low RE-USY.

At least a portion of the hydrocarbon feedstock supplied to the FCC unit can be converted, thereby producing higher value products having about 2 to 3 carbon atoms per molecule. In certain embodiments, the large pore zeolite component of an FCC catalyst mixture is a stable faujasite type zeolite, and preferably a Y-type faujasite zeolite. The medium pore sized zeolite component can be a ZSM-5 type catalyst. In addition to the large and medium pore size zeolite components, the catalyst can also include at least one porous inorganic refractory metal oxide as a binder. Exemplary metal oxide binder compounds include kaolin, $Al_2(OH)$, and/or $Si_2O_5$. In certain embodiments, the metal oxide binder can include acid cracking functionality that can facilitate the cracking of the heavier components present in the FCC feed. In certain embodiments, the medium pore size zeolite component can be present in an amount of between about 0.5% and about 5% of the total weight of the catalyst, preferably at least about 1% by weight of the total catalyst weight.

In another embodiment, the FCC catalyst particles can include (a) particles that include a large pore size zeolite and a porous, inorganic refractory metal oxide binder, and (b) particles that include a medium pore size zeolite and a porous, inorganic refractory metal oxide binder. In yet another embodiment, the catalyst particles can include between about 0.5 and 10% by weight phosphorus. In other embodiments, the FCC catalyst particles can include between about 0.1 and 10% by weight of a promoter metal, wherein the promoter metal can be selected from the group consisting of gallium, germanium, tin, and mixtures thereof. In certain embodiments, the FCC catalyst particles can also include a metal selected from the group consisting of zinc, copper, nickel, silver and cadmium.

In certain embodiments, the FCC catalyst can include a group IV metal, such as zirconium. In certain preferred embodiments, the zirconium is preferably incorporated into the pores of the catalyst support. In certain embodiments, the incorporation of the zirconium serves to increase the surface area of the substrate by up to about 15%, preferably between about 10% and 20%, more preferably between about 15% and 25%. In certain embodiments, following incorporation of zirconium, the catalyst composition can be impregnated with a Lewis acid, such as a Group II metal. An exemplary Group II Lewis acid is zinc.

Optionally, the zeolite can be treated with up to about 10% by weight of a phosphorus-containing compound, calculated as $P_2O_5$, based on the total amount of higher value product selective zeolite present. Without being bound by a specific theory, the inclusion of the phosphorous is believed to promote selectivity for light higher value products. After treatment with the phosphorus-containing compound, the phosphorous treated zeolite can be dried and subsequently calcined at a temperature between about 300° C. and 1000° C., preferably between about 450° C. and 700° C., for between about 15 minutes and 24 hours, to produce a higher value products-selective cracking catalyst (hereinafter "HVPS cracking catalyst").

The FCC cracking catalyst, on which carbonaceous materials may be deposited, can be supplied from the stripping zone to the regeneration zone, and can optionally be supplied with a portion of heavy hydrocarbons. In the regeneration zone, the FCC cracking catalyst and deposited carbonaceous materials are subjected to oxidation treatment to decrease the amount of the carbonaceous deposits, thereby generating regenerated catalysts. The regenerated FCC cracking catalyst can be continuously recycled back to the reaction zone. The cracked products can be quenched just upstream of, or just downstream of, the separator, thereby avoiding unnecessary further cracking or excessive cracking of the feedstock or cracked materials. Exemplary materials for forming the base catalyst can be selected from alumina, silica and aluminosilicates.

In certain embodiments, the catalyst mixture includes a base FCC catalyst and an FCC additive. The base FCC catalyst can include a stable Y-type zeolite, which is the main active component of the base FCC catalyst, and can also include a matrix which forms the substrate material for the zeolite. The base cracking catalyst can include less than about 0.5% by weight of a rare-earth metal oxide that is present in the ultra stable Y-type zeolite. Without being bound by any specific theory, it is believed that having up to about 0.6% of a rare earth metal oxide present is beneficial and improves the catalyst activity and hydrothermal stability, however at greater concentrations, the presence of additional rare earth metal oxide can result in decreased overall unit conversion. Generally, the catalytic activity of stable Y-type zeolites increases as the concentration of the rare-earth metal in the zeolites increases. Without wishing to be bound to a specific theory, it is believed that the incorporation of rare-earth metals with the Y-type zeolite results in an increased thermal stability of the catalyst. In certain embodiments, it is believed that the hydrogen transfer reaction activity of the Y-type zeolite can be increased with the addition of a rare-earth metal to the zeolite.

In certain embodiments, the stable Y-type zeolite is present in the base cracking catalyst in an amount of greater than about 5% by weight, alternatively between about 5 and 50% by weight, and preferably between about 15 and 40% by weight. As used herein, the term "stable" Y-Type zeolite also includes other zeolite materials such as "ultrastable" zeolitic materials.

The matrix of the base FCC catalyst used in this invention can include clays, modified clays, and/or silica. Exemplary clays include kaolin (a layered silicate having the chemical composition $Al_2Si_2O_5(OH)_4$), montmorillonite (a hydrated sodium calcium aluminum magnesium hydroxide having the chemical structure $(Na,Ca)_{0.33}(Al,Mg)_2(S_4O_{10}(OH)_2 \cdot nH_2O)$, and bentonite (aluminum phyllosilicate). The base cracking catalyst matrix can also include inorganic porous oxides, such as alumina, silica, magnesia, and silica-alumina. The base FCC catalyst can have a bulk density of between about 0.5 and 1 g/ml, an average particle diameter of between about 50 and 100 micron, and a pore volume of between about 0.05 and 0.5 mL/g. The support material can be a montmorillonite clay having a surface area of between about 50 and 350 $m^2/g$, and which has been calcined to a temperature of at least about 550° C.

The FCC catalyst mixture can include, in addition to the base FCC catalyst, an FCC additive that includes a shape-selective zeolite. As used herein, "shape selective zeolite" refers to a zeolite having a pore diameter that enables only hydrocarbons with a limited shape to enter the zeolite through its pores. Exemplary shape-selective catalysts can include: ZSM-5, omega, SAPO-5, and aluminosilicates. ZSM-5 is a preferred shape selective zeolite. The additive can include between about 20 and 70% by weight, preferably between about 30 and 60% by weight, of the shape-selective zeolite.

In one embodiment, the FCC catalyst mixture can include between about 55 and 95% by weight of the base FCC catalyst and between about 5 and 40% by weight of the FCC additive. In certain embodiments, if the base FCC catalyst is present in an amount of less than about 55% by weight of the total mixed FCC catalyst, or if the additive is present in an amount greater than about 40% by weight of the total mixed FCC catalyst, high yields of the light-fraction higher value products can be difficult to obtain because of low conversions of the petroleum oil feed. In certain other embodiments wherein the percentage of the base FCC catalyst is greater than about 95% by weight, or wherein the shape selective additive is present in an amount of less than about 5% by weight, high conversion of the petroleum oil feed can be achieved, however the high conversion of the petroleum oil feed generally does not include a very high yield of the light-fraction higher value products. In one exemplary embodiment, the FCC catalyst includes at least about 0.5% by weight phosphorous, typically present as $P_2O_5$.

In certain embodiments, the present invention can be employed with any of the typical FCC catalysts, such as those produced and sold by BASF, Grace Davison, and Ablemarle.

In an exemplary embodiment of the present invention, FCC cracking catalyst particles can be used that include between about 5-50% by weight of an FCC cracking catalyst component selected from a zeolite, non-zeolitic molecular sieve, a catalytically active amorphous silica alumina species, or combination thereof. The FCC cracking catalyst particles can include one or more matrix component selected from clays, modified clays, alumina, and the like. Optionally, the FCC cracking catalyst particles can include a binder, such as an inorganic oxide sol or gel.

Some exemplary FCC catalysts for use in the present invention include Intercat's LGS series of catalysts, particularly LGS-550. These materials typically include alumina sites that allow for cracking of the sulfur containing compounds. In these compounds, dehydrogenation of the sulfur species to produce coke and benzothiophene compounds is less prevalent. This allows for cracking of the sulfur containing compounds, which in turn generally produces light sulfur compounds. Other suitable catalysts for use in the present invention include Prime-G (Axens), a naphtha selective hydrodesulfurization catalyst, Prime-G+ (Axens), or a type-Y, USY, REY or RE-USY catalyst, and the like. Generally, the FCC catalysts suitable for use in the present invention are deep hydrodesulfurization catalysts, typically capable of reducing sulfur content to less than about 25 ppm, more preferably capable of reducing the sulfur content to less than about 10 ppm.

In certain embodiments, the FCC catalyst can be an FCC catalyst produced by Albemarle Catalysts Co., such as the Amber, Aztec, Centurion, Centurion Max, Cobra, Conquest, Conquest HD, Coral, Eclipse, Emerald, FOC, Opal, Ruby, or Sapphire catalysts, typically including an $SiO_2$ or $Al_2O_3$ carrier or support, and a zeolite active agent. Suitable FCC additives for use with the Cobra catalyst can include members of the BCMT family of additives, B.O.O.S.T., ELIMI-NOx, io-1010, IsoBoost, K-2000, members of the KDNOx family of additives, members of the KOC family of additives, OCTUP-11S, Plus-1, PROvantage, members of the Resolve family of additives, SOxDOWN, SP-10S, and ZOOM. Preferred additives include members of the Isoboost and Resolve families of FCC additives. In certain preferred embodiments, the FCC additive is a member of the Resolve family of FCC additives, designed to reduce sulfur content of the product stream from the FCC unit.

In certain embodiments, the FCC catalyst can be produced by BASF, such as the ContrOlefin, Defender, Endurance, Engelhard maximum propylene solution (MPS), HDXtra, Flex-Tec, NaphthaClean, Maxol, NaphthaMax, NaphthaMax II, NaphthaMax III, NaphthaMax-LGS, Petro-Max, PetroMax-DMS, PetroMax-MD or Stamina catalysts, each of which typically includes an Si/Al support material. In certain embodiments, the FCC catalyst can be member of the NaphthaMax® family of catalysts produced BASF Catalysts, typically including a silicon and/or aluminum support material, and a Y-type zeolite active material, and/or a DMS (distributed matrix structure) active material. Suitable FCC additives for use herein can include the Converter, HDUltra, CLEANOx, EZ Flow, EZ Flow Plus, BASF Maximum Olefins Additive (MOA), BASF Octane Enhancement Additive (OEA), BASF Maximum Propylene Additive (MPA) and BASF Low Sulfur Additive (LSA). In certain embodiments, FCC additives for use with the NaphthaMax® catalysts include Low Sulfur Additive (LSA), Octane Enhancement Additive (OEA), Ultra Stable Promoter (USP), and/or Maximum Olefins Additive (MOA). In certain preferred embodiments, the FCC additive is a Low Sulfur Additive (LSA).

In certain embodiments, the FCC catalyst can be produced by Grace Davison, such as the Advanta, APEX, Aurora, Aurora LLI, Brilliant, Futura, Genesis, GFS, Goal, Impact, Kristal, Midas, Nadius, Nektor, Nektor-ULCC, Neptune, Nexus, Nomus, Nomus-DMAX, Orion, Pinnacle XLC, ProtAgon, ResidMax, RFG, SuRCA, Spectra, Ultima, Vanguard, Spectra, and Ultima catalysts, each of which typically includes an $Al_2O_3$ or $SiO_2$ support material. In certain embodiments, the FCC catalyst is a member of the GFS or Orion series of FCC catalysts, produced by Grace Davison. Certain Grace Davison catalysts can include the Selective Active Matrix (SAM) and Tunable Matrix Alumina (TMA) systems. Suitable FCC additives for use herein include the Activa, AP-PMC (APEX), Butimax, CP-3, CP-5, CP-A, D-PriSM, Flowmotion, GSR-1, GSR-5, XNOx, DENOX, Super DESOX, OlefinesExtra, OlefinsMax, OlefinsUltra, ProfiExtra, ProfiMax, RFG, Saturn, and SuRCA additives. Suitable FCC additives for use with the GFS and Orion series of FCC catalysts preferably include OlefinsMax™ and OlefinsUltra™ additives, which incorporate ZSM-5, as well as SuperDESOX™, GSR-1 and D-PriSM™ additives. In certain preferred embodiments, the D-PriSM™, a gasoline sulfur reduction FCC additive, can be utilized.

In certain embodiments, the FCC additive is a member of Intercat's LGS™ family of FCC additives (Intercat, Inc.; New Jersey, USA), which are designed to reduce the sulfur content of the product stream. Other Intercat additives suitable for use herein include BCA-105, COP-375, COP-550, COP-850, Isocat, LGS-150, Octamax, Pentacat, Pentacat Plus, Pentacat-HP, SoCat-HP, Soxgetter, Z-CAT-HP, ZMX-B-HP, and ZMX-C-HP additives.

Other suitable catalysts for use herein include those produced by Catalysts & Chemicals Industries Co., LTD (CCIC), such as, ACZ, CRN, CVZ, DCT, HMR, PRM, and STW catalysts. Additives produced by CCIC suitable for use herein include io, OCTUP-7, OCTUP-11, Plus-1, SP-10S and SP-60S additives, particularly the io additives designed for use in producing low sulfur gasoline. Other suitable catalysts for use herein include those produced by SINOPEC Catalyst Company (SCC), for example, CC-20D, CDC, CDOS, CEP, CGP-1, CGP-2, CHP, CHV, CIP, Comet 400, COKC1-3, CR-005, CR-022, CRC, CRP, DMC, DMMC, DOCR, DOS, DVR, GOR-C, HGY, HGYP, HPY, MLC-500, MMC-2, MP051, DMMC, Orbit series, OEP-1, RAG1-9, RAG1-11, RFC, RGD, RICC1-3, RMMC-1, RSC, VRCC-1, ZC-7000, ZC-7300, and ZCM 7 catalysts, particularly the CGP-2 and DOS low sulfur catalysts. Additives produced by Sinopec suitable for use herein include CA, GOR-A, LDC-971, LGSA, MP-051, MS-011, RFS-C and ZHP additives, particularly the LGSA and MS-011 additives, which are designed for use in preparing low sulfur gasoline.

Catalyst To Oil Ratio. In certain embodiments, increasing the concentration of the FCC catalyst in the FCC reactor, referred to herein as the "cat/oil" ratio or "catalyst/oil" ratio, can increase the availability of catalyst for cracking, thus leading to maximum conversion of the petroleum oil feedstock. This can be achieved by increasing the FCC reactor heat load or by switching to a catalyst that is selected for the production of lower coke (i.e., a lower delta coke catalyst). The reactor heat load can be raised by either increasing the reactor temperature or by decreasing the feed rate. Either of these methods will, in turn, increase the cat/oil ratio and maintain the heat balance of the unit. In certain embodiments, the ratio of the amount of the FCC catalyst mixture recycled (ton/hr) to a rate of the feed oil fed to the FCC unit (ton/hr) is in the range of 10 to 45% wt/wt.

Conventional FCC systems typically require that the unit operators closely monitor system outputs, and require that the operators are constantly available to make manual adjustments to the operations of the system, including, for example, the FCC catalyst injection rates and other operating conditions, such as the catalyst/oil ratio, as needed. In one embodiment of the present invention, a remote monitoring system is employed to monitor the operating conditions and product parameters, and to make adjustments to the FCC catalyst injection rates, the FCC additive injection rates, and other operating conditions, thereby controlling the FCC catalyst/oil ratios. This reduces the reliance on the interactions of the operator with the system to perform the various tasks, such as monitoring and making manual changes to the FCC catalyst injection schedule, the FCC additive injection schedule, and other process variables. In one aspect of the present invention, the feed rate of fresh FCC catalyst and FCC additive can be monitored and controlled with an FCC catalyst monitoring system. In one specific embodiment, the feed rate of the fresh FCC catalyst and FCC additive can be dependent on the petroleum oil feed composition, and the optimum feed rate of fresh FCC catalyst and FCC additive can be predicted by the process models discussed in greater detail below.

Reaction Time. In certain embodiments of the present invention, an increase in reaction time available for cracking is one adjustable operating parameter that, when adjusted, can result in an increased conversion. Put differently, it is typically the case that an increase in the contact time between the FCC catalyst, FCC additive, and the petroleum oil feedstock in the reaction zone can increase the conversion of the feed. The rate of addition of fresh or regenerated FCC catalyst, the rate of addition of the FCC additive, the riser steam rate, the recycle rate, and operating pressure are other exemplary operating parameters and variables that can affect reaction time for a given unit configuration. Overall conversion of the feedstock to gasoline can vary inversely with the conversion rate due to reactor size limitations that may limit availability of FCC catalyst for cracking. In certain embodiments, wherein the feed rate of the FCC catalyst to the reaction zone was decreased by between about 3-5% relative to a base FCC catalyst feed rate, the overall conversion may increase by about 1% (when compared with the conversion rates for the base feed rate). As used herein, contact time refers to either the time between the start of contacting of the oil feedstock with the FCC catalyst and the separation of the cracked products from the FCC catalyst, or, the time between the start of contacting of the oil feedstock with the FCC catalyst and the quenching of the reaction, for example, wherein the produced cracked products are quenched just upstream of the separation zone. In one preferred embodiment, the contact time is between about 0.1 to 1.5 seconds, preferably between about 0.2 to 0.9 seconds. In certain embodiments, if the contact time is less than about 0.1 seconds, then the yield of the light-fraction higher value products can be decreased because of the decreased conversion of the heavy oil fraction. Conversely, in certain embodiments, if the contact time is longer than about 1.5 sec, then the thermal cracking of the petroleum oil feedstock can be excessive, resulting in an increased production of dry gases. However, for all embodiments, the optimum contact time depends upon the feed system, and the optimum reaction time of the feedstock and the catalyst can be determined utilizing the process modeling and control systems of the present invention.

Reactor Temperature. In general, an increase of the reactor temperature results in an increase of the FCC unit conversion, typically because of an increased reaction rate for the endothermic cracking reaction. Additionally, an increased cat/oil ratio may also result in the FCC unit conversion. For example, an increase in the reactor temperature of about 10° F. can result in an increase of the overall conversion by about 1-2%. The higher reactor temperature can also result in an increase of the octane of the gasoline product and amount of LPG higher value products, which are desirable side benefits of maximizing conversion through the use of increased temperatures. The increased octane is a result of the higher rate of the primary cracking reactions, relative to secondary hydrogen transfer reactions that result in saturation of the higher value products in the gasoline boiling range and lowers gasoline octane. Generally, an increase of about 10° F. in reactor temperature can result in an increase of the research octane number (RON) and motor octane number (MON) of up to about 0.8 and 0.4, respectively.

As used herein, "reaction outlet temperature" refers to the temperature at the outlet of the down flow-type reaction zone, and is the temperature before separation of the cracked products from the catalyst. In certain embodiments the reaction zone outlet temperature can be in the range of between about 500° C. and 630° C., preferably in the range of between about 590° C. and 620° C. In another embodiment, the temperature of the reaction zone is maintained at between about 575° C. and 600° C. In certain embodiments, when the reaction zone outlet temperature is less than about 570° C., then the light-fraction higher value products are not obtained in a high yield from residue or heavy oil cracking. In other embodiments, if the reaction temperature is greater than about 630° C., then the thermal cracking of the heavy oil fraction present can be significant, thereby increasing the amount of dry gases produced. In certain embodiments wherein naphtha is present in the feedstock in significant amounts, the reaction temperature required for optimized desulfurization of the products can be decreased, relative to other the reaction temperatures used for other petroleum feedstocks, compared to residue cracking to optimized products desulfurization. However, for all embodiments, the contact time depends upon the feed system, and the optimum reaction time of the feedstock and the catalyst can be determined utilizing the process modeling and control systems of the present invention, as described below.

Pressure. In general, increased conversion of the feedstock and increased coke yield are thermodynamically favored at higher pressures. Feedstock conversion, however, is not significantly affected by the FCC unit pressure because a substantial increase in pressure is typically required to significantly increase conversion. In certain embodiments, the FCC unit can be operated at a reaction pressure of between about 1 to 3 kg/cm$^2$ and at a regenerating zone temperature of between about 650° C. and 700° C.

Reactor. In certain embodiments, the FCC unit can include a regeneration zone that can include a regenerator, a down flow-type reaction zone that includes a downer reactor or "downer", a separation zone that includes a separator, and a stripping zone that includes a stripper. The FCC unit reactor can also be equipped with multiple sensors operable to monitor the composition of the feed and product lines, and which can be integrated with a control system. The control system can include means to control catalyst loading rates and catalyst discharge rates in real-time, wherein the loading and discharge rates of catalyst are based on reactor performance.

Typically, the variables described above are generally not optimized for maximizing the conversion of the petroleum oil feedstock to value added products in existing FCC units, or for the optimization of desulfurized products. Optimum conversion levels for the FCC unit are based upon and correspond to a given feed rate, feed quality, set of processing objectives, and catalyst, and are also dependent upon other unit constraints (e.g., wet gas compressor capacity, fractionation capacity, air blower capacity, reactor temperature, regenerator temperature, and catalyst circulation). Therefore, during typical FCC unit operation, the operator is required to monitor and adjust several variables at the same time. If an optimum conversion level is found, only then can the operator begin to investigate a suitable catalyst and/or design of the catalyst properties, to shift the operation to a higher optimum conversion level.

Modeling and Optimization Package. Advanced software designed to improve throughput and control of continuous processes that have incipient disturbances are known and can be used to optimize the FCC unit performance. These software packages are suitable for automatically provide for control over continuous processes that are often difficult to control by conventional automation techniques. There are many processes that are subject to disturbances whose onset is too fast for conventional manual or automatic control to react, such as the adjustment of the catalyst/oil ratio based upon sulfur content in a product stream. The use of modeling and optimization packages will allow for issues to be addressed more quickly, and may also result in increased throughput and reduced energy usage through superior control during normal operation and through avoidance or mitigation of process upsets and disturbances that, at times, can lead to the shut down of the FCC process. FCC units that employ process modeling and optimization controls also require less manual intervention from human operators responsible for the process, thereby allowing the human operators to focus their attention on higher-level production control activities. In certain embodiments, the processes of the present invention can include the use of a software package, such as Umetric's SIMCA P11 or the optimization tools in Matlab by MathWorks Inc. The software packages that may be used in the present invention provide optimization routines that minimize the use of math functions that include representations of the processes, products and energy costs.

In one exemplary embodiment, a system and method for controlling the rate of injection of fresh FCC catalyst and FCC additive into an FCC unit is provided. The system can include at least one FCC catalyst injection apparatus for providing FCC catalyst and/or FCC additive to an FCC unit, at least one sensor adapted to provide information about the composition of an FCC unit product stream, and a controller communicatively coupled to the sensor. Alternatively, the system can include a sensor that is configured to provide information related to the rate of withdrawal of the product stream from the reaction zone of the FCC unit. Optionally, the FCC unit can include one or more sensors that are designed to provide information that is related to one or more of the following: the composition of the petroleum oil feedstock, the rate of addition of the petroleum oil feedstock, the rate of addition of the FCC catalyst, and the rate of addition of the FCC additive. In one embodiment, the controller regulates the addition of the FCC catalyst and the FCC additive to the reaction zone, in response to the various measurements provided by the sensor.

In another embodiment, a method for injecting a calculated amount of FCC catalyst from a catalyst injection system into the FCC unit is provided wherein the method is designed to maximize the production of higher value products. The method can include the steps of dispensing catalyst from a catalyst injection system into the FCC unit, sensing and monitoring the output in the FCC unit, and automatically adjusting the amount of FCC catalyst dispensed in response to the at least one sensed metric. Alternatively, the method can include sensing and monitoring a reaction parameter of the FCC unit, such as the temperature or pressure of the reaction zone. In other embodiments, the method can include sensing and monitoring the riser outlet temperature. In alternate embodiments, the method can include sensing and monitoring the FCC catalyst addition rate, the sulfur reduction composition addition rate, and the sulfur content of at least one product stream. Alternatively, the method can include the sensing and monitoring of the FCC catalyst level in the reactor and/or the sulfur reduction composition level in the reactor. Alternately, the method can include the steps of dispensing an FCC additive from an FCC additive injection system into the FCC unit, sensing and monitoring the output from the FCC unit, and automatically adjusting the injection rate of the FCC additive in response to at least one sensed metric. In other embodiments, the method can include the sensing and monitoring of the pressure differential between the catalyst regenerator and the reactor.

Referring now to FIG. 1, the proposed catalytic cracking process can optionally include one or more control systems (singly and collectively referred to herein as "Process Control"). The signals from FCC unit 60 are communicated from sensors positioned within the process equipment of the FCC unit to Distributed Control System ("DCS") 10, a process control system that uses a network to interconnect sensors, controllers, operator terminals and actuators. DCS 10 can include a computer, which can in turn be connected to the various sensors, controllers, operator terminals and actuators, and which can be interconnected with one or more other systems or programs, including on-line performance monitoring module ("CPM") 20, Model Predictive Control ("MPC") 30, Selection of Process Model ("SPM") 40, FCC Unit Profit and Energy Cost Calculation ("FUPEC") 50, FCC 60 and Power Management System ("PMS") 70, each of which is described in further detail below.

As used herein, computer refers to any personal computer, laptop, server, or the like, whether networked with other computers or dedicated to a particular FCC unit. The computing device can include one or more modules for performing various calculations from data gathered with the sensors, including correlations, corrections, or statistical methods. The computing device can include computer instruction code, such as for example, Java, C, C++, Visual Basic, and the like. The software code can be stored as a series of instructions or commands on a readable computer medium, including random access memory, read only memory, a magnetic medium, such as for example, a hard drive or floppy disc, an optical medium, or like device. The computer can be configured such that when signals are received from various sensors that may be present in the FCC unit, the computer identifies the signal and determines to which sensor or piece of equipment the signal corresponds to, and either routes the signal to an appropriate associated process or module, or processes the signal and sends a processed signal to the appropriate associated process or module.

The computer can also be configured to display data associated with the signals received from the sensors, or data received from one or more of the associated systems or programs. The system can also include a computer program product associated with the FCC unit and stored on a tangible computer memory media and operable on the computer to perform various operations related to controlling and providing instructions to the FCC unit, including the actuators and valves, and to control and provide instructions to the various peripheral devices that are associated with the FCC unit. The computer program product associated with the FCC unit can also be configured to correlate the signals that are received with the appropriate associated module or system for improving the efficiency of the FCC process.

One advantage to the use of various systems and modules to improve overall efficiency is the ability for each of the associated systems or programs to be communicatively coupled, thereby allowing for multiple factors to be considered prior to the implementation of adjustments to the process.

DCS 10 can also be in communication with on-line performance monitoring module ("CPM") 20. CPM 20 can be configured to receive signals and/or data from DCS 10, which can be communicatively coupled FCC unit 60 and sensors located within the various pieces of equipment that make up the FCC unit. CPM 20 can be configured to receive and process signals that originate in FCC unit 60 and can be communicatively coupled to MPC 30, described below. CPM 20 can be configured to receive data from DCS 10 and send the data to MPC 30 with instructions to the MPC to update the model, if the model quality has degraded.

In certain embodiments, Model Predictive Control ("MPC") 30 can be provided. As noted above, MPC 30 can be communicatively coupled to CPM 20, as well as being optionally communicatively coupled to DCS 10 and SPM 40, described below. MPC 30 is an advanced process control method that improves on standard feedback control by being configured to predict how a process, such as distillation, will react to one or more input, such as an increase in the heat supplied to the process. This means that the feedback, i.e., the measurement signals from the process that is being controlled, can be relied on much less because the effect of various inputs and changes to the FCC unit can be derived and predicted from mathematical empirical models. The feedback measured from FCC unit 60 (i.e., the measurement of various parameters in response to a change or alteration of one or more process parameters) and deviations from the measured values and MPC 30 predicted values can be used to correct for inaccuracies in the models. MPC 30 relies on empirical models of processes obtained by plant testing to predict and optimize the future behavior of dependent variables in dynamic systems based on past responses of one or more independent variable. In certain embodiments, the controller may rely upon linear models of the process. Thus, MPC 30, in certain embodiments, can predict the outcome of adjusting two or more operating parameters at the same time. MPC 30 software is available commercially from suppliers including AspenTech (DMC+), Honeywell (RM-PCT), and Shell Global Solutions (SMOC).

Optionally, MPC 30 can include a module for the optimization of industrial process systems through Real Time Optimization and Dynamic Optimization ("RTO"), which is one way of adjusting the process control variables to find reaction conditions that achieve the highest gasoline production and/or desulfurization. Typically, many conflicting responses are optimized simultaneously. Processes having a large number of different variables are difficult to "fine-tune." In a process that lacks a systematic approach to adjusting operating parameters, optimization is typically done by "trial-and-error" or by changing one control variable at a time while holding the rest constant. Such methods are generally less efficient in finding the true optimum and can be extremely time consuming. In such processes, during such a "fine tuning" process, the act of finding an optimum can result in poor yields and efficiency, or may result in poor product, thus necessitating further treatment. In the present invention, optimization techniques involve development of rigorous process models utilizing mathematical models that can include chemical reactions and thermodynamic equations. One exemplary RTO tool is NOVA (PAS Inc.), which provides all of the functionalities described above. The models suggested by RTO can then be validated against actual plant operation data to verify the model accurately represents the plant behavior. These models are dynamic in the sense they model the time of change of process variables.

Optionally, the system shown in FIG. 1 can include Control Loop Performance Monitoring ("CLMP") (not shown). Performance monitoring allows (1) benchmarking current control performance against industry standards, (2) identifying & prioritizing problems to focus maintenance resources, (3) analyzing and diagnose problems with online and offline reports, (4) improving control performance with a complete set of tools for both regulatory and advanced controllers, and (5) monitoring to sustain improvements with comprehensive automated reporting. Exemplary CLMP products include ProcessDoctor (Matrikon), Profit Expert (Honeywell International Inc.), MD Diagnostic (Yukogawa) and AspenWatch (Aspen Technology, Inc) provide such functionalities.

The system also provides a module for the detection of operating conditions and Selection of Process Model ("SPM") 40. This system uses signals from the various sensors positioned within FCC Unit 60 to determine the performance of one or more operating condition, such as current feed rate, feed composition, catalyst levels within the reactor, catalyst addition rate, additive levels within the reactor, additive addition rate, air addition, temperatures within the FCC unit, such as riser outlet temperature, operating pressures, and ambient temperature, and then selects the process model that best represents the current operation. This selected process model can then be used to calculate the optimal process settings. The tools for this step in the overall process can be developed with Matlab (Mathworks Inc.), or can be separately programmed utilizing Visual Basic code or any other suitable software programming language.

The system can also include FCC Unit Profit and Energy Cost Calculation ("FUPEC") 50, which includes software for performing calculations using various monitored process data, such as for example, FCC steam, catalyst, electricity and products, thereby allowing costs to be monitored and/or calculated and allowing for real-time monitoring the dollar cost per unit of products generated by FCC unit 60. FUPEC 50 can be communicatively coupled to DCS 10 such that it is operable to send signal to and receive signals from the DCS. Optionally, FUPEC 50 can be connected to one or more pieces of FCC unit 60. FUPEC 50 can also be used in conjunction with one or more other systems or programs that are designed to project the cost changes associated with making adjustments to one or more operating condition or parameter of the FCC unit, for example, an increase in the temperature or pressure within the FCC catalyst bed.

Optionally, the system can include Power Management System ("PMS") 70 module. PMS 70 is communicatively coupled to send signals to, and receive signals from, DCS 10, and can be configured to balance energy requirements with the available energy supply, and thus prevents power fluctuations or even blackouts, which may result in a disruption of operations. Furthermore, through the management of the power to FCC unit 60, PMS 70 can enable better control of energy costs, enhanced safety, and the mitigation of environmental impacts. ABB Ltd. is believed to be one provider of such technology. In certain embodiments, PMS 70 can be communicatively coupled to all power generating and utilization sources of FCC 70. PMS 70 can also be communicatively coupled to DCS 10. PMS 70 can be communicatively coupled to all power generating and power utilization devices, and FUPEC 70.

Optionally, the system can include Field Bus Technology ("FFS") (not shown). The field signals used in process instrumentation are typically standardized, thereby allowing control systems and field devices from a variety of suppliers to be interconnected using standard 4 to 20 mA analog signals. The FOUNDATION fieldbus™ standard developed by the Fieldbus Foundation™ currently constitutes the next level of standardization and it is designed to meet modern needs. In addition to having interconnectivity equivalent to that available using 4 to 20 mA analog signals in a conventional field network, FOUNDATION fieldbus™ allows multiple devices to be connected to a single FOUNDATION fieldbus™, permits the interactive communication of various types of information, and enables the distribution in the field of intelligent functions including self-diagnostics and control functionality. Thus, within one embodiment of the present invention, a single fieldbus can be used to interconnect all devices. Preferably, the fieldbus has the ability to transmit various types of information in addition to the ability to field signals and to distribute intelligence to distributed field devices. In certain embodiments, the fieldbus enables remote monitoring, real-time self-diagnostics, and proactive maintenance of field devices, as well as plant resource management using field communication. This can greatly reduce operating instrumentation systems costs. Emerson Corp. is one exemplary provider of these technologies.

Figure 2:
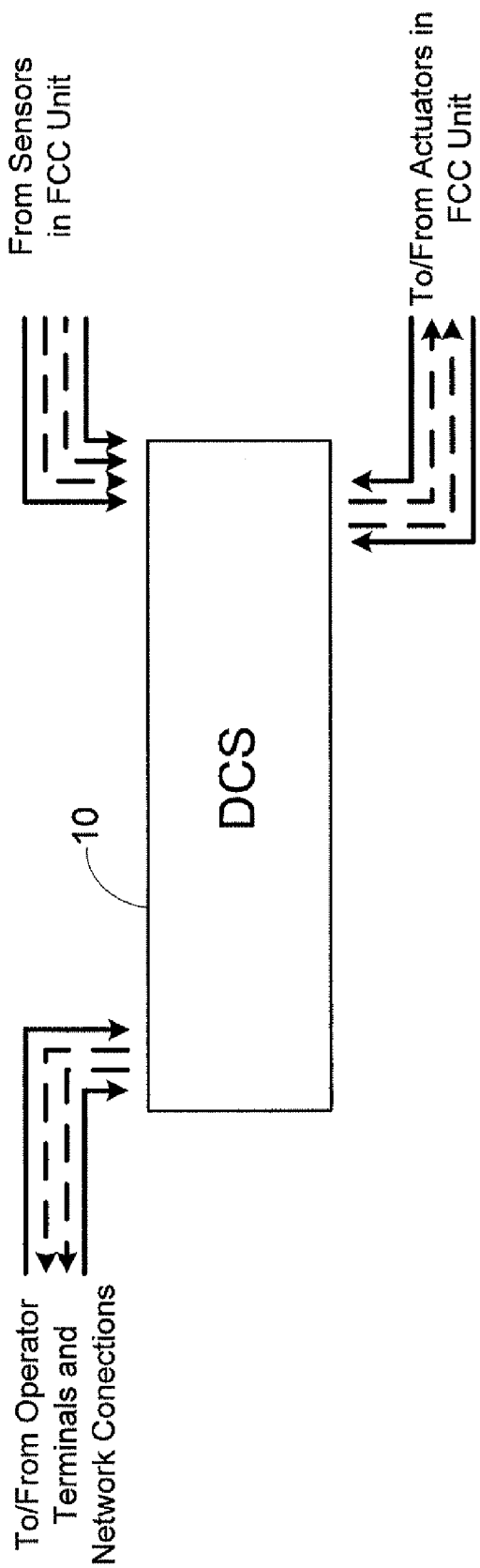
FIG. 2 is a diagram of an embodiment of a process for upgrading a petroleum feedstock according to the present invention.

In certain embodiments, the operating conditions or process parameters are continually monitored and automatically adjusted, as necessary. The performance monitoring of the proposed high severe fluid catalytic cracking conversion process can provide tools to: (a) benchmark current control performance against desired standards; (b) analyze and diagnose problems with online monitoring and control; (c) improve control performance with a complete set of advanced controllers and tools; (d) monitor to sustain improvements with comprehensive, automated reporting; and (e) remotely monitor the process or system using multiple sensing units and make adjustments on catalyst injections and other operating conditions to the system outputs, while at the same time reducing the reliance on human interactions such as monitoring and manual changes to the catalyst injection schedule and other process variables. Such systems can be built by many commercial venders, such as those identified above, and can be integrated into FCC unit 60. In certain embodiments, the monitoring systems can include sensors which may be positioned throughout FCC unit 60 to monitor feed and product characteristics and reaction conditions. In certain embodiments, the sensors communicate with DCS 10 via hard wired connections to the system. In certain other embodiments, the sensors can be configured to communicate with DCS 10 via wireless, RFID, or a like communication means. Thus, as shown in FIG. 2, while DCS 10 is not shown to be hardwired the flow control valves or sensors present in FCC unit 60, it is understood that DCS 10 is communicatively coupled to the FCC unit.

Figure 3:
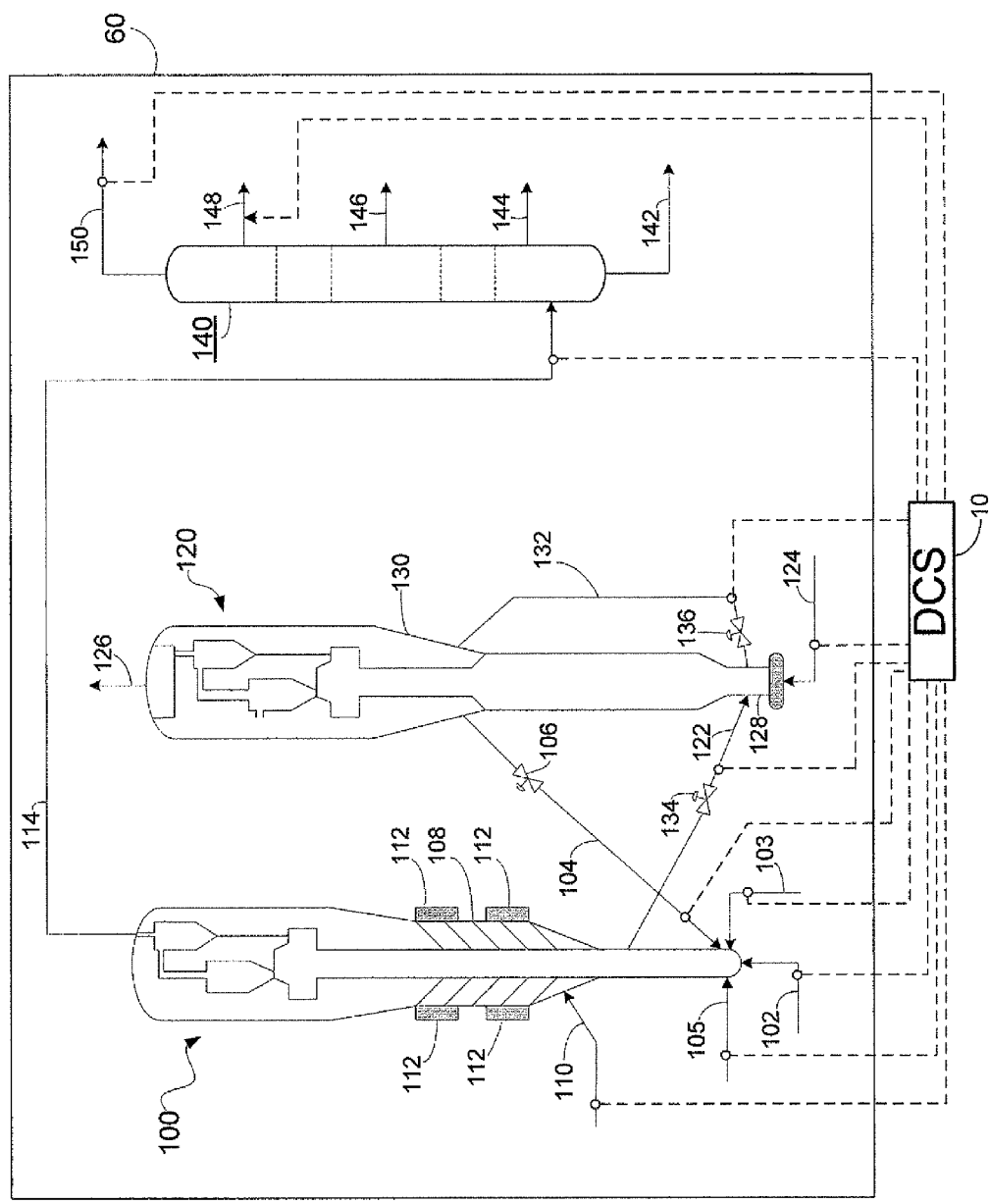
FIG. 3 is a diagram of an embodiment of a process for upgrading a petroleum feedstock according to the present invention.

Referring now to FIG. 3, the detailed integration of DCS 10 and FCC unit 60 are shown. Hydrocarbon feedstock 102 is supplied to the bottom of reaction zone 100 of FCC unit 60. Hot FCC catalyst is supplied to the reaction zone 100, as fresh FCC catalyst can be supplied via line 103, or regenerated FCC catalyst can be supplied via line 104. Line 104 can include regenerated FCC catalyst control valve 106. Additionally, an FCC additive can be supplied to reaction zone 100 via line 105, which can be controlled by a control valve (not shown). In certain embodiments, the process operates without a lift gas as the FCC catalyst moves from the regenerator to the reactor by control of the pressure differential between the two locations. An optional lift gas (not shown) can be introduced near the liquid and solid feed inlets. Hydrocarbon feedstock 102 vaporizes and forms a dilute phase suspension with the FCC catalyst and the FCC additive. The dilute phase suspension passes up through reaction zone 100, which can generally get wider to accommodate volumetric expansion. Cracked FCC products and coked FCC catalyst can then pass into a solid-vapor separation means, such as a conventional cyclone.

Means for stripping entrained hydrocarbons from the FCC catalyst are provided in stripper 108. Preferably a conventional stripping steam is added via line 110. For example, a microwave (MW) or a sonic stripping section 112 is a simple representation of one optional embodiment of the present invention. A number of variations can be incorporated using multiple MW/Sonic sources 112, which can be configured to radially apply energy to the stripping section.

Optionally, stripper 108 can be lined with a material that internally reflects the selected microwave (MW) or sonic radiation, thereby ensuring that the MW/Sonic energy is used for the hydrocarbons and undesirable heteroatoms, such as sulfur and nitrogen containing compounds, and also ensuring that the MW/Sonic energy is not wasted in heating of the steel stripper vessel.

In one embodiment of the present invention, a majority of the MW/Sonic energy is applied in a relatively dense phase region of stripper 108, which permits a longer residence time. Although the concept shown in the embodiment of the drawing will be the suitable for many installations, it should not be considered limiting.

In new units, the use of a multi-stage MW/Sonic stripper, having the ability to remove stripped products at multiple points in the stripping operation, is preferred. The ability to selectively heat hydrocarbons and/or sulfur and nitrogen containing compounds afforded by embodiments of the present invention allows for the use of shorter stripping residence time. Stripping techniques previously used, for example, to de-water paper pulp can now be used in catalytic stripping processes. Put differently, after applying microwave energy, the FCC catalyst can be passed over relatively large cross-sectional area surfaces with an applied vacuum on one side of the surface to assist in the stripping operation. Porous stainless steel filters can be used. Alternatively, annular flow of the FCC catalyst around a porous stainless steel filter can be employed to strip hydrocarbons and/or sulfur and nitrogen compounds from catalyst which has been exposed MW/Sonic stripper.

Cracked products and stripper effluent vapors combine to form a product mixture. The product mixture can be supplied from reaction zone 100 to fractionation column 140 by line 114. Spent FCC catalyst that can include coke can be withdrawn from reaction zone 100 via line 122 and supplied to FCC catalyst regeneration zone 120. The flow rate of spent FCC catalyst from the reaction zone 100 to the FCC catalyst regeneration zone 120 can be controlled, for example, using spent FCC catalyst control valve 134. FCC catalyst can be regenerated, for example, by contacting the spent FCC catalyst with regeneration gas 124. Regeneration gas 124 can be an oxygen-containing gas, such as air. Flue gas can be withdrawn from regeneration zone 120 via line 126. During regeneration, FCC catalyst circulates from coke combustor 128 to dense catalyst bed 130. At least a portion of the FCC catalyst can be recycled from dense catalyst bed 130 to the base of coke combustor 128 via line 132, and the rate of recycle can be controlled by valve 136.

Conventional operating conditions can be employed in fractionation column 140. For example, the product mixture can be preheated to a temperature of between about 150° C. and 375° C. before being supplied to fractionation column 140.

The product mixture from reaction zone 100 can be supplied via line 114 to fractionation column 140, where the produced mixture can then be separated into a variety of fractions, for example, into a heavy slurry oil stream 142, heavy cycle oil 144, light cycle oil 146, naphtha 148, and a light overhead stream 150. Light overhead stream 150 can be rich in $C_2$-$C_4$ olefins, $C_1$-$C_4$ saturates, and other light cracked gas components. Light stream 150 can typically be further treated in an unsaturated gas plant to recover the various light gas streams, including $C_3$-$C_4$ LPG, and optionally $C_2$-fuel gas or the like.

In certain embodiments of the present invention, various control valves, for example valves 106, 134, and 136, and an optional FCC additive control valve, can each be independently communicatively and operatively coupled to DCS 10, thereby allowing for control of the flow rates of their respective streams. In another embodiment, one or more of the input streams can be fitted with one or more sensors, and may optionally also include one or more control valves, thereby allowing for sampling and/or control of the respective streams (additional control valves and/or sensors not shown in FIG. 3 can be included). The sensors can be configured to measure the flow rates, temperature and/or physical properties of each of the respective stream. Moreover, the sensors can be operatively coupled to DCS 10, as demonstrated by the dashed lines.

Figure 4:
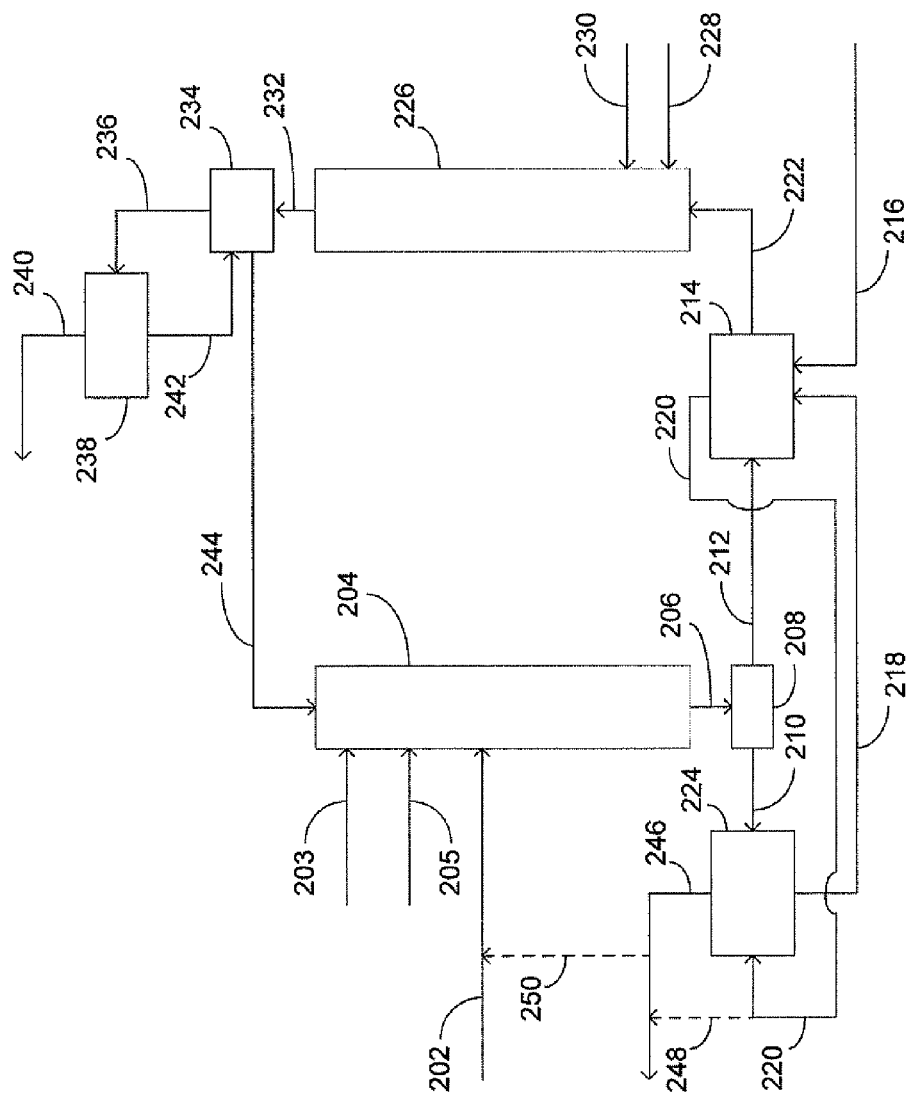
FIG. 4 is a diagram of an embodiment of a process for upgrading a petroleum feedstock according to the present invention.

Referring now to FIG. 4, a novel FCC desulfurization process according to one embodiment of present invention is provided. Petroleum oil feedstock 202 can be supplied to FCC unit reaction zone 204, which can include an FCC catalyst, supplied via optional fresh catalyst line 203 or regenerated catalyst line 244, and which can also include an FCC additive supplied via line 205, and which is maintained at a temperature and pressure that is operable to crack and desulfurize the feedstock upon contacting the feedstock with said FCC catalyst and an FCC additive. Spent FCC catalyst, upgraded hydrocarbons, and unreacted feedstock can be supplied via line 206 to gas/solid separator 208, which can be, for example, a cyclone type device. Gas/solid separator 208 provides first stream 210, which can include hydrocarbon gases, and second stream 212, which can include unreacted feed and FCC catalyst that can include hydrocarbons adsorbed onto the surface thereof (referred to hereafter as "spent" FCC catalyst).

Second stream 212, which can include spent FCC catalyst and minimal amounts of cracked hydrocarbons and unreacted hydrocarbons, can be supplied to stripper 214. In certain embodiments, stripper 214 can be a cyclone. Stripper 214 produces an overhead stream 220 that can include cracked hydrocarbon gases, which can be supplied to product recovery section 224. Optionally, overhead stream 220 can be combined with product stream 246. Stripper 214 also produces a spent catalyst stream 222, which can be supplied to regeneration zone 226 where heavy hydrocarbons adsorbed on the catalyst can be removed with a stripping gas, which can be introduced into the regeneration zone via line 216. Flow of the stripping gas can be controlled by a flow control valve. Flow of striping gas can be controlled and optimized in a control strategy designed to: (a) minimize energy use and FCC catalyst cost, which is a function of catalyst deactivation, (b) improve FCC product quality, and (c) increase unit throughput.

The stripping gas can be, for example, steam produced in a boiler or alternatively can be an inert gas such as nitrogen. The steam or inert gas used in regeneration zone 226 can be pressurized and/or heated to an optimized pressure and temperature, which can be calculated using the process models designed to (a) minimize energy and FCC catalyst cost, (b) improve FCC product quality, and (c) increase unit throughput.

For stripping conditions, in certain embodiments, a stripping temperature of between about 500° C. and 640° C. and an FCC catalyst residence time of between about 1 and 10 minutes are preferred. The values of the striping temperature and residence can be controlled and optimized using process models to achieve product quality.

After the regeneration of spent FCC catalyst in regeneration zone 226, regenerated FCC catalyst in the upper portion of the turbulent-phase fluidized bed can be transferred to a riser-type regenerator. Regeneration zone 226 can optionally be supplied with fresh FCC catalyst via line 228 and/or an inert gas via line 230. Regenerated FCC catalyst from riser-type regenerator 226 can be supplied to catalyst hopper 234, located at the top of the riser type regenerator, via line 232. FCC catalyst hopper 234 can function as a gas-solid separator, where flue gases that can include the by-products of coke combustion can be separated from the regenerated FCC catalyst and removed through secondary separator 238 via line 236. Line 236 can include flow a controller valve. FCC catalyst can be returned to FCC catalyst hopper 234 from secondary separator 238 via line 242, and flue gases can be removed via line 240. In certain embodiments, secondary separator 238 can be a cyclone.

In certain embodiments, a portion of the regenerated FCC catalyst in FCC catalyst hopper 234 can be returned back to reaction zone 204 through line 244, which can include a flow controller valve. The flow controller valve can be subjected to control and optimization to achieve one or more of the following: (a) minimize energy and catalyst cost, (b) improve FCC product quality, and (c) increase unit throughput.

As described above, the FCC catalyst circulates within the apparatus through reaction zone 204, gas-solid separation zone 208, stripping zone 214, regeneration zone 226, FCC catalyst hopper 234, and can be resupplied to the reaction zone from the FCC catalyst hopper via line 244.

Product recovery zone 224 can include means for separating cracked hydrocarbon products from residual FCC catalyst to produce a product stream 246 and an FCC catalyst recycle line 218. In certain embodiments, a portion of the product stream may be combined with the petroleum oil feedstock 202 via line 250 and recycled to the reaction zone 204.

Although not shown, it is understood that the process described in FIG. 4 can include one or more valves operable to control the flow of the petroleum oil feedstock, cracked products, and FCC catalyst. The process can also include use of one or more sensors (not shown) positioned at various positions within the process operable to provide feedback relating to the petroleum oil feedstock, the FCC catalyst, and the reaction conditions within one or more of the reaction zone, the stripper, or the regeneration zone. The sensors can be communicatively coupled to a DCS, which in turn can be coupled to one or more of the following: OPM, MPC, SPM, FUPEC and PMS. Additionally, the DCS can be communicatively coupled to one or more valves or actuators, which can be utilized to control the feed rate of the petroleum oil feedstock, the removal of the FCC catalyst from the reaction zone, the addition of the FCC catalyst to the reaction zone, the addition of the FCC catalyst to the regeneration zone, the addition of the FCC additive to the reaction zone, or other process associated with the FCC unit.

In another aspect, the present invention can include a method for injecting FCC catalyst from an FCC catalyst injection system into an FCC unit designed to maximize the production of higher value products. The method includes the steps of (1) dispensing FCC catalyst from an FCC catalyst injection system into a reaction zone of an FCC unit, (2) sensing an output in the FCC unit, and (3) automatically adjusting the amount of FCC catalyst dispensed in response to at least one sensed response. The method can further include using process models, as well as computations from optimization routines, to (a) minimize energy and FCC catalyst usage; (b) maximize value added products concentration; and (c) increase overall unit throughput.

In another aspect, the present invention can include a method for injecting FCC catalyst additive from an FCC catalyst additive injection system into the reaction zone of an FCC unit designed to maximize the production of higher value products. The method includes the steps of (1) dispensing FCC catalyst additive from an FCC catalyst additive injection system into a reaction zone of an FCC unit, (2) sensing an output in the FCC unit, and (3) automatically adjusting the amount of FCC catalyst additive dispensed in response to at least one sensed response. The method can further include the use of one or more process models, as well as computations from optimization routines, to (a) minimize energy and FCC catalyst additive usage; (b) maximize value added products concentration; and (c) increase overall unit throughput. In certain embodiments, the method can include the use of one or more process models, as well as computations from optimization routines, to minimize FCC catalyst additive usage and maintain a full-range gasoline product stream.

In addition, one or more sensors can be positioned in-line within the FCC unit to monitor the FCC catalyst particles and provide in-line measurement of various desired reaction conditions and properties, including reaction temperature, reaction pressure, flow rates, FCC catalyst particle size, FCC catalyst injection rate, FCC additive injection rate, chemical composition of feedstock and product fluid streams, regeneration zone temperature, regeneration zone pressure, product stream boiling point range, and product stream sulfur content. It is understood that one or more sensors may be advantageously positioned throughout the FCC system, as desired, to measure or detect certain desired reaction conditions or reaction properties. The sensors can be operatively and communicatively linked to the control system, which, upon sensing the one or more property associated with the FCC process, can implement a strategy to develop process models linking, for example, process models that link particle size with the remaining process variables. A signal can be generated relating the one or more sensed or measured property, and can be used to optimize the amount of catalyst supplied to the reactor and/or the amount of striping gas supplied to the regeneration zone, in order to optimize the production of higher value products, or to maximize the desulfurization of a gasoline product stream. Alternatively, in one embodiment, one or more sensors can be positioned to measure the sulfur content of the product stream. A signal relating to the sulfur content of the product stream can be generated and sent to the controller. The controller can optionally process the signal, and send the signal to one or more associated modules which can analyze the various reaction parameters, such as FCC additive injection rate, to determine if an adjustment of the FCC additive injection rate is necessary. In certain embodiments, the controller can then adjust the FCC additive injection rate, in an effort to decrease the sulfur content of the product stream.

In one embodiment, a preheated feedstock such as hydrocarbon oil, vacuum gas oil or naphtha, can be charged to the a mixing section of the reaction zone, which can be controlled by a valve. The feed flow through this inlet port can be a controllable variable. The control and optimization strategy can change the value of this flow target (i.e., the amount of FCC catalyst and FCC additive that is supplied to the reaction zone) to allow a greater amount of feed to be supplied to the FCC unit, provided that certain process constraints, such as valve openings, pressure limits and temperature limits, are respected and that the FCC product specifications, such as a desired sulfur content, are met. The feed can be mixed with FCC catalyst and FCC additive, wherein the FCC catalyst can be supplied by either a fresh FCC make-up stream or the regenerated FCC catalyst from the catalyst hopper in the mixing zone. The amount of FCC catalyst and/or FCC additive that is injected into the mixing zone of the reaction zone of the FCC unit can be controlled using flow controllers. Flow of the FCC catalyst and/or the FCC additive can be optimized using developed process models of the FCC unit and an optimization strategy designed to: (a) minimize energy, FCC catalyst cost, and FCC additive cost, (b) improve FCC product quality (for example, by reducing sulfur content), and (c) increase unit throughput. Additionally, the flow of FCC catalyst can be optimized to maximize cracking and/or desulfurization of the feed steam.

Another benefit to one embodiment of the advanced process control of the present invention is that the technique monitors the unit output under different operating conditions, and records a "fingerprint" of normal operations. Because of the placement of various sensors within the FCC unit and the continuous monitoring thereof, the system can detect deviations from the fingerprint, and a database of fingerprints can be generated and used to predict what is happening to the process. Historical data can thus be used to create a predictive system which can provide an early warning of potential equipment failure. In preferred embodiments, the system can detect problems or potential problems earlier than they would have shown up using conventional monitoring techniques.

In certain embodiments, the optimization routines provided by the present method provide a significant reduction in performance costs for the preparation of gasoline having a desired sulfur level. For example, a 90,000 BPD FCC unit that is configured to produce approximately 50,000 BPD of FCC gasoline, may undercut the gasoline endpoint by between about 10 and 20° C. in an effort to reduce the sulfur content of the gasoline (as the higher boiling gasoline fractions have increased concentrations of sulfur containing compounds). Undercutting is one industry technique that is utilized to produce gasoline having a specific sulfur concentration. The undercutting procedure essentially eliminates a portion of the higher boiling gasoline fraction in an effort to remove a substantial fraction of the sulfur compounds that are present. The in turn results in an overall reduction in the amount of gasoline produced by the FCC unit. For the above noted FCC unit, the increased revenue that can be realized by employing the optimization methods of the present invention is about $17 million. As the present method results in a full range gasoline, rather than an undercut gasoline product, the increased revenue is the result of substantially greater gasoline production, and is balanced against increased usage of FCC catalyst and FCC additive to achieve the desired sulfur levels in the gasoline product. This increased revenue also assumes that approximately 10% of the undercut gasoline can be recovered from the light cycle oil, with the light cycle oil being valued as heavy fuel oil.

EXAMPLES

The examples below demonstrate that the conversion and desired product yields of value added products can be optimized for minimum energy input with the benefit of advanced process control. In particular, advanced control and monitoring tools have been shown to increase process throughput of the petroleum feedstock, resulting in improved overall yield of cracked products of about 2%, a reduction of the production variability of about 10%, and a reduction of energy consumption of up to about 3%, relative to the base case, which does not employ any of the advanced control and monitoring tools of the present invention.

Example 1

In one exemplary embodiment, a vacuum gas oil sample was supplied to an FCC unit that included a reaction zone, a regeneration zone, and a stripper that includes a microwave or sonic energy producer, to produce high-yield gasoline with a high octane. The FCC unit was charged with a catalyst that included a base catalyst of about 20% by weight of an ultra stable Y-type zeolite and about 77% by weight of an amorphous aluminosilicate matrix. The reactor was operated such that the reaction zone was maintained at a temperature of between about 500° C. and 550° C. and a pressure of between about 8 and 30 psig. The catalyst/oil ratio was maintained between about 5 and 16 wt/wt. The exit temperature of the regenerator for the hot catalyst was between about 650° C. and 815° C.

The FCC unit produced a product stream that includes approximately 10% by weight liquefied petroleum gas, about 45-55% by weight FCC gasoline, about 13-18% by weight light cycle oil, and heavy fractions.

Example 2

As shown in the table below, increasing the amount of FCC additive, relative to the FCC catalyst, results in decreased sulfur content of the resulting gasoline fraction. For example, a vacuum gas oil having a sulfur content of approximately 1.5% by weight was cracked in an FCC unit at a temperature of about 518° C. utilizing a commercially available base FCC catalyst and a commercially available FCC additive, to produce a desulfurized full range (i.e., 221° C. fraction). As shown, sulfur content decreases with increased FCC additive usage.

| Percentage of FCC Additive (by weight) | Gasoline sulfur content, ppm | % reduction in gasoline sulfur |
|---|---|---|
| 0 (base catalyst) | 764 | N/A |
| 5% | 656 | 14.3 |
| 10% | 604 | 21.0 |
| 15% | 558 | 27.1 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and the include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A method for the fluid catalytic cracking of petroleum oil feedstock to produce a full-range low-sulfur gasoline product stream, the method comprising the steps of:
    feeding petroleum oil feedstock to a reaction zone of a fluid catalytic cracking unit;
    feeding a base cracking catalyst to the reaction zone of the fluid catalytic cracking unit, the base cracking catalyst comprising a stable Y-type zeolite and less than 0.6% by weight of rare-earth metal oxide;
    feeding a fluid catalytic cracking additive to the reaction zone of the fluid catalytic cracking unit, the fluid catalytic cracking additive comprising a shape-selective zeolite, wherein an average pore size of the shape-selective zeolite is smaller than an average pore size of the base cracking catalyst;
    wherein the base cracking catalyst and the fluid catalytic cracking additive are present in an amount of between 55 to 95% by weight of the base cracking catalyst and between 5 and 45% by weight of the fluid catalytic cracking additive; and
    wherein the base cracking catalyst and the fluid catalytic cracking additive are each added separately to the reaction zone of the fluid catalytic cracking unit;
    contacting the petroleum oil feedstock, the base cracking catalyst, and the fluid catalytic cracking additive in the reaction zone of the fluid catalytic cracking unit for a reaction zone contact time of between 0.05 and 3 seconds to obtain a mixed hydrocarbon stream, said mixed hydrocarbon stream comprising a desulfurized hydrocarbon product stream, unreacted petroleum oil feedstock, and spent catalyst, wherein the reaction zone is maintained at a temperature of between 500° C. and 630° C.;
    separating and collecting the desulfurized hydrocarbon product stream from the spent catalyst and the unreacted petroleum oil feedstock in a stripping zone;
    withdrawing a stream comprising the desulfurized hydrocarbon product and the unreacted petroleum oil feedstock from the stripping zone;
    separating the desulfurized hydrocarbon product stream to produce the full-range low-sulfur gasoline product stream;
    recycling at least a portion of the desulfurized hydrocarbon product from the stream withdrawn from the stripping zone, through a first separation zone before sending the recycled portion of the desulfurized hydrocarbon product to the reaction zone; and
    controlling feed rates of the petroleum oil feedstock, the base cracking catalyst, and the fluid catalytic cracking additive to the reaction zone with a process control, using a distributed control system, wherein the step of controlling the feed rates comprises the steps of:
        continuously monitoring and collecting data corresponding to a composition of the petroleum oil feedstock, a composition of the full-range low-sulfur gasoline product stream, the feed rates of the base cracking catalyst and the fluid catalytic cracking additive, and operating conditions of the fluid catalytic cracking unit, measured directly from sensors of the fluid catalytic cracking unit;
        providing the data corresponding to the petroleum oil feedstock, the full-range low-sulfur gasoline product stream, the feed rates of the base cracking catalyst and the fluid catalytic cracking additive, and the operating conditions of the fluid catalytic cracking unit to the distributed control system and comparing the results against historical data; and
        adjusting the feed rate of the fluid catalytic cracking additive using the distributed control system, to optimize desulfurization of the petroleum oil feedstock,
    wherein the distributed control system comprises a network of controllers configured to process the data measured directly from the sensors of the fluid catalytic cracking unit, to predict how adjustment of one or more of the data affects the optimization of the desulfurization of the petroleum oil feedstock, and to adjust the feed rate of the fluid catalytic cracking additive based on the predicted adjustment of the one or more of the data affecting the optimization of the desulfurization of the petroleum oil feedstock.

2. The method of claim 1 further comprising the steps of:
    determining a sulfur content in the full-range low-sulfur gasoline product stream;
    adjusting at least one parameter selected from a rate of feed of the petroleum oil feedstock to the reaction zone of the fluid catalytic cracking unit, the fluid catalytic cracking unit reaction zone temperature, or the reaction zone contact time between the petroleum oil feedstock, the base cracking catalyst, and the fluid catalytic cracking additive to achieve an adjusted operating condition; and
    determining the sulfur content of the full-range low-sulfur gasoline product stream when the fluid catalytic cracking unit is operating under the adjusted operating condition.

3. The method of claim 1 further comprising:
    determining an initial real-time sulfur content in the full-range low-sulfur gasoline product stream;
    calculating a simulated sulfur content in the full-range low-sulfur gasoline product stream based upon an adjustment of at least one operating parameter, wherein the at least one operating parameter is selected from a feed rate of the petroleum oil feedstock to the reaction zone of the fluid catalytic cracking unit, a feed rate of the base cracking catalyst to the reaction zone, a feed rate of the fluid catalytic cracking additive to the reaction zone, the temperature of the reaction zone of the fluid catalytic cracker unit, or the contact time between the petroleum oil feedstock, the base cracking catalyst, and the fluid catalytic cracking additive;
repeating the step of calculating a simulated sulfur content until a maximum simulated desulfurization is achieved;
comparing the maximum simulated desulfurization with the an initial sulfur content in the full-range low-sulfur gasoline product stream; and
if the sulfur content in the maximum simulated desulfurization is less than the initial sulfur content in the full-range low-sulfur gasoline product stream, then adjusting at least one operating parameter to reduce sulfur content of the full-range low-sulfur gasoline product stream.

4. The method of claim 1 wherein the fluid catalytic cracking unit is a down-flow or riser type fluid catalytic cracking reactor.

5. The method of claim 1 wherein the fluid catalytic cracking unit comprises a regeneration zone, a second separation zone, and the stripping zone.

6. The method of claim 5 wherein the fluid catalytic cracking unit further comprises the first separation zone coupled to the second separation zone.

7. The method of claim 1 further comprising recycling at least a portion of unreacted oil feedstock to the reaction zone.

8. The method of claim 1 wherein the reaction zone contact time of the base cracking catalyst, the fluid catalytic cracking additive, and the petroleum oil feedstock is between 0.1 and 1.5 seconds.

9. The method of claim 1 wherein the reaction zone contact time of the base cracking catalyst, the fluid catalytic cracking additive, and the petroleum oil feedstock is between 0.2 and 0.9 seconds.

10. The method of claim 1 wherein a ratio of the base cracking catalyst and the fluid catalytic cracking additive to the petroleum oil feedstock in the fluid catalytic cracking unit is between 10 to 50 wt/wt.

11. The method of claim 1 wherein the fluid catalytic cracking additive comprises ZSM-5.

12. The method of claim 1 wherein the petroleum oil feedstock is selected from the group consisting of an oil selected from the group consisting of naphtha, crude oil, deasphalted oil, vacuum gas oil, gas oil, petroleum residue, hydrotreated petroleum oil products, and mixtures thereof.

13. The method of claim 1 wherein the base cracking catalyst comprises between 0.1 and 10% by weight of a promoter metal.

14. A method for the fluid catalytic cracking of a petroleum oil feedstock to produce a full-range low-sulfur gasoline product stream, the method comprising the steps of:
feeding the petroleum oil feedstock to a reaction zone of a fluid catalytic cracking unit, said reaction zone comprising a mixture of between 55 to 95% by weight of a base cracking catalyst and between 5 to 45% by weight of a fluid catalytic cracking additive, and up to 10% by weight of a phosphorous containing compound;
wherein the base cracking catalyst comprises a stable Y-type zeolite and up to 0.6% by weight of rare-earth metal oxide; and wherein the fluid catalytic cracking additive comprises a shape-selective zeolite;
contacting the mixture and petroleum oil feedstock in the fluid catalytic cracking unit reaction zone for a reaction zone contact time of between 0.005 and 3 seconds to produce a mixed hydrocarbon stream, wherein the fluid catalytic cracking unit reaction zone is maintained at a temperature of between 500° C. and 650° C., and
wherein said mixed hydrocarbon stream comprises a treated hydrocarbon product;
separating the treated hydrocarbon product from unreacted petroleum oil feedstock;
collecting a treated hydrocarbon product stream in a stripping zone;
withdrawing a stream comprising the treated hydrocarbon product stream and the unreacted petroleum oil feedstock from the stripping zone; and
recycling at least a portion of the treated hydrocarbon product stream withdrawn from the stripping zone, through a separation zone before sending the recycled portion of the treated hydrocarbon product stream to the reaction zone,
wherein the addition of petroleum oil feedstock, base cracking catalyst and fluid catalytic cracking additive to the reaction zone are controlled by a distributed control system, the distributed control system comprising at least one computer and at least one peripheral program, the distributed control system configured to perform the steps of:
continuously monitoring data corresponding to a composition of the petroleum oil feedstock, a composition of the treated hydrocarbon product stream, and operating conditions of the fluid catalytic cracking unit measured directly from sensors of the fluid catalytic cracking unit;
developing process models based on the data, wherein the process models are operable to optimize the operating conditions of the fluid catalytic cracking unit and to produce the treated hydrocarbon product stream having a reduced sulfur content;
comparing a performance of the fluid catalytic cracking unit with the process models; and
adjusting the operating conditions of the fluid catalytic cracking unit to provide the treated hydrocarbon product stream having the reduced sulfur content,
wherein the distributed control system further comprises a network of controllers configured to process the data measured directly from the sensors of the fluid catalytic cracking unit, to predict, using the developed process models, how adjustment of one or more of the data affects optimization of the operating conditions of the of the fluid catalytic cracking unit and the production of the treated hydrocarbon product stream having the reduced sulfur content, and to adjust the operating conditions of the fluid catalytic cracking unit based on the predicted adjustment of the one or more of the data affecting the optimization of the operating conditions of the of the fluid catalytic cracking unit and the production of the treated hydrocarbon product stream having the reduced sulfur content.

15. The method of claim 14 further comprising the steps of:
sending a signal relating to the sulfur content of the treated hydrocarbon product stream from the distributed control system to a selection process module;
receiving, by the selection process module, the signal from the distributed control system;
calculating, by the selection process module, an adjustment of an injection rate of the fluid catalytic cracking additive to the reaction zone of the fluid catalytic cracking unit;
sending a signal from the selection process module to the distributed control system corresponding to the adjustment of the injection rate of the fluid catalytic cracking additive to the fluid catalytic cracking unit;

sending a signal from the distributed control system to the fluid catalytic cracking unit corresponding to the adjustment of the injection rate of the fluid catalytic cracking additive to the fluid catalytic cracking unit;

receiving, by the fluid catalytic cracking unit, the signal from the distributed control system corresponding to the adjustment of the injection rate of the fluid catalytic tracking additive to the fluid catalytic cracking unit; and adjusting, by the fluid catalytic cracking unit, the injection rate of the fluid catalytic cracking additive to the fluid catalytic cracking unit in response to receiving the signal from the distributed control system.

\* \* \* \* \*

UNITED STATES PATENT AND TRADEMARK OFFICE
CERTIFICATE OF CORRECTION

Page 1 of 1

PATENT NO. : 9,764,314 B2
APPLICATION NO. : 12/785647
DATED : September 19, 2017
INVENTOR(S) : Al-Alloush, Taha and Khan It is certified that error appears in the above-identified patent and that said Letters Patent is hereby corrected as shown below:

In the Claims

In Column 33, Line 8, Claim 15, the word appears as "tracking" and should read --cracking--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*